(12) United States Patent
Sandefur et al.

(10) Patent No.: US 11,179,860 B2
(45) Date of Patent: Nov. 23, 2021

(54) CUTTING APPARATUS

(71) Applicants: Terry Sandefur, Bayfield, CO (US); Charles A. Patterson, Durango, CO (US); Tim Schneider, Durango, CO (US)

(72) Inventors: Terry Sandefur, Bayfield, CO (US); Charles A. Patterson, Durango, CO (US); Tim Schneider, Durango, CO (US)

( * ) Notice: Subject to any disclaimer, the term of this patent is extended or adjusted under 35 U.S.C. 154(b) by 0 days.

(21) Appl. No.: 17/000,357

(22) Filed: Aug. 23, 2020

(65) Prior Publication Data

US 2020/0384659 A1 Dec. 10, 2020

Related U.S. Application Data

(60) Continuation-in-part of application No. 16/571,100, filed on Sep. 14, 2019, now Pat. No. 10,780,593, which is a division of application No. 16/035,624, filed on Jul. 14, 2018, now Pat. No. 10,449,680, which is a continuation-in-part of application No. 15/706,737, filed on Sep. 17, 2017, now Pat. No. 10,046,468, which is a division of application No. 14/681,072, filed on Apr. 7, 2015, now Pat. No. 9,796,099.

(60) Provisional application No. 61/976,503, filed on Apr. 8, 2014.

(51) Int. Cl.
*B26B 15/00* (2006.01)
*B26B 19/06* (2006.01)
*A01G 3/037* (2006.01)

(52) U.S. Cl.
CPC .............. *B26B 15/00* (2013.01); *A01G 3/037* (2013.01); *B26B 19/06* (2013.01)

(58) Field of Classification Search
CPC ......... B26B 15/00; B26B 19/06; A01G 3/039; A01G 3/08; A01G 3/033; H01H 19/62; H01H 9/06; H02K 7/145; F02B 2075/025
USPC ...... 30/210, 228, 180, 192, 247; 310/50, 47; 318/346, 443, 466
See application file for complete search history.

(56) References Cited

U.S. PATENT DOCUMENTS

| | | | | |
|---|---|---|---|---|
| 2,055,129 A * | 9/1936 | Hill | ...................... | B26B 19/148 30/29.5 |
| 2,490,086 A * | 12/1949 | Page | ...................... | B26B 15/00 30/228 |
| 3,039,189 A * | 6/1962 | McBerty | ................ | A01G 3/033 30/245 |
| 3,798,768 A * | 3/1974 | Cowley | .................. | A01G 3/053 30/223 |

(Continued)

*Primary Examiner* — Ghassem Alie
(74) *Attorney, Agent, or Firm* — Roger A. Jackson

(57) ABSTRACT

A cutting apparatus for trimming an article, the apparatus has a manually grasped power element with a reciprocating arm having a removably engagable rotatable couple including a selectable rotational index position lock. Also included is a cutting head assembly that is removable and rotationally indexable relative to the power element, the cutting head having a pair of cutting blades for trimming the article. Wherein operationally, the reciprocating arm drives the cutting blades that have scissor movement with the cutting head selectably rotatable to the power element, user wrist fatigue is reduced, also with the cutting head being removable from the power element, the cutting head assembly is easier to clean.

13 Claims, 20 Drawing Sheets

(56) References Cited

U.S. PATENT DOCUMENTS

| | | | | |
|---|---|---|---|---|
| 4,651,761 A * | 3/1987 | Suen | ............... | B26B 19/20 |
| | | | | 132/148 |
| 4,979,303 A * | 12/1990 | Han | ............... | B26B 19/06 |
| | | | | 30/210 |
| 5,067,375 A * | 11/1991 | Wolter | ............ | H02G 1/1212 |
| | | | | 81/9.42 |
| 5,426,856 A * | 6/1995 | Aiyama | ............ | A01G 3/053 |
| | | | | 30/208 |
| 6,973,727 B2 * | 12/2005 | Yao | ............... | A01G 3/037 |
| | | | | 30/228 |
| 7,100,373 B2 * | 9/2006 | Oide | ............. | B23D 15/14 |
| | | | | 30/228 |
| 2013/0247384 A1 * | 9/2013 | Ishiguro | .......... | A01G 3/08 |
| | | | | 30/228 |

* cited by examiner

CUTTING APPARATUS

RELATED PATENT APPLICATIONS

This application is a continuation in part (CIP) of U.S. divisional patent application Ser. No. 16/571,100 filed on Sep. 14, 2019 by Terry Sandefur of Bayfield, Colo., U.S. and Charles A. Patterson of Durango, Colo., U.S. of United States continuation in part (CIP) patent application Ser. No. 16/035,624 filed on Jul. 14, 2018 by Terry Sandefur of Bayfield, Colo., U.S. and Charles A. Patterson of Durango, Colo., U.S., of U.S. divisional patent application Ser. No. 15/706,737 filed on Sep. 17, 2017 by Terry Sandefur of Bayfield, Colo., U.S. that is a divisional of U.S. patent application Ser. No. 14/681,072 filed on Apr. 7, 2015 by Terry Sandefur of Bayfield, Colo., U.S. that claims the benefit of U.S. provisional patent application Ser. No. 61/976,503 filed on Apr. 8, 2014 by Terry Sandefur of Bayfield, Colo., U.S.

TECHNICAL FIELD

The present invention relates generally to a cutting apparatus that is hand held for the purpose of trimming off selected parts of an article. More particularly, the present invention of the cutting apparatus has powered cutting blades that are axially pivotable about a cutting head for hand held comfort and the cutting blades are removable for cleaning stemming from article contamination of the cutting blades.

BACKGROUND OF INVENTION

Trimming an article can be a tedious and boring process, especially when a high number of repetitive cuts need to be made, even with the use of a powered cutter, the constant re-positioning of the powered cutter can lead to operator hand and wrist fatigue in having issues similar to the well-known carpal-tunnel syndrome from a high number of repetitive hand and wrist motions. Another issue can be the oil or tar resin present in the article that can gum up the cutting blades of the cutting apparatus, requiring frequent blade cleaning. Most cutting apparatus are designed for general use in that they can be applied to a number of different cutting uses, from fabric, to sheet steel, to wire mesh, to plant and tree pruning, to paper, to hair, to cardboard, to wood sheeting, and so on. Each one of these cutting apparatus uses ideally has specialized cutting blades, i.e. sharpness, clearance, blade cutting pattern, material of the cutting blade, speed of the cutting blades coming together, the force of the blades coming together, the angle that the blades come together, how tightly clamped the blades are to one another at their mutual pivot point, and so on.

However, there are additional issues with the cutting apparatus outside of the cutting blade specifics described above that concern user or operator fatigue, as most cutting apparatus tasks are limited in the amount of time or the amount of cutting that is done, i.e. cutting fabric for a single sewing project, this issue of operator fatigue is typically not addressed. This is mostly due to the fact that when a large amount of cutting is required, such as the mass production of clothing in manufacturing thus requiring many thousands of clothing items with the required fabric cutting being done on a large scale would be partially or totally automated, not only to save time, but to ensure constant repetitive quality in the fabric cutting. Thus, when the cutting situation arises wherein one would have the need to do fairly high volumes of repetitive cutting, however, not enough cutting volume to justify automation, the problem arises of operator fatigue is using for instance a handheld cutting apparatus and doing a high number of repetitive cutting motions.

This leads to the need for design modifications to reduce operator fatigue in using the handheld cutting apparatus for highly repetitive cutting motions, these design modifications would include ways to minimize fixed hand and wrist positioning, i.e. facilitating a variety of different hand and wrist motions for accomplishing the same cutting function. Further, structure to make separable blade cleaning easy, as this is mostly an issue with the article to be trimmed is of an organic nature and can leave a residue on the cutting blade during use that can act to impair the cutting blades efficiency and increase friction as between the blades, thus overloading the drive motor.

In looking at the prior art in U.S. Pat. No. 3,631,596 to Glaus, disclosed is an electric scissors assembly having a stationary blade and an independently oscillating blade driven by a motor, all mechanical and electrical parts, particularly the scissors, motor and battery being accommodated and mounted in a handle-shaped casing made of two assembled parts of plastic material without any screw-fastened portions by means of elastic portions latched to the casing, and all of the mechanical and electrical parts being readily exchangeable. Glaus has a Teflon slider ring 10 that is inserted between the cutting blades to reduce friction thus reducing motor power required therethrough the eccentric motor drive 23, requiring minimal space, see FIGS. 2 and 3. In Glaus, the focus is upon the mechanism of the scissors having ease of assembly and disassembly, wherein the scissors cutting head and the motor/drive mechanism are a single assembly, as best shown in FIGS. 1 and 3. Glaus has no teaching relative to an axially pivoting scissors head that is independently removable.

Continuing in the prior art in United States Patent Application Number 2013/0247384 to Ishiguro, disclosed is an electric scissor that is provided with; a moving first blade, a moving second blade, a toggle link mechanism including a first link, a second link, and a drive shaft; and a drive section. In Ishiguro, one end of the first link is rotatably connected to a transmission portion of the first blade and one end of the second link is rotatably connected to a transmission portion of the second blade. Ishiguro has the other end of the first link rotatably connected to the other end of the second link through the drive shaft. The drive section in Ishiguro is configured to open/close the first blade and the second blade by displacing the drive shaft in a direction perpendicular to an axial direction of the drive shaft. The toggle link mechanism in Ishiguro has the advantage of increasing the mechanical advantage of the cutting blade to cutting blade closing force as the cutting blades are drawn closer together, thus according to Ishiguro added cutting force between the blades in created when it is needed most, being near the end of the cut, i.e. specifically for tree branch pruning. The drawback of the Ishiguro toggle link mechanism is in its size, requiring a significant amount movement space as shown in FIGS. 1, 2, 4, and 5. The increasing mechanical advantage of the toggle link can best be seen in going from FIG. 1 to FIG. 2, and the graph in FIG. 3. Ishiguro also has no teaching relative to an axially pivoting scissors head that is independently removable.

Further, in the prior art in U.S. Pat. No. 3,693,254 to Salonen disclosed is a portable, hand-held shearing implement, which includes a pair of cutting blades employing a motor powered mechanism to apply the cutting force, Salonen having a similar toggle link blade cutting mechanism to Ishiguro thus providing for increased mechanical advantage in proportion to the closing of the blades together. The invention in Salonen is particularly adaptable for an implement to execute individual, deliberate, cutting strokes, i.e. such that a single "cut" can be selectably executing such that the cutting blades are just moved together a single time as desired, this is as opposed to most powered cutting blades that of necessity continuously move together and apart from one another, wherein a single selectable blade cut cannot be executed.

One version in Salonen may be powered by an electric motor or a self-contained internal combustion engine, driving through a gear reduction train to a reciprocatory mechanism having threaded means with a releasable coupling to drive the power stroke. Another version in Salonen employs a controllable reversing switch to effect the reciprocative action and is limited to an electric motor drive. In the former version of Salonen, reopening of the blades is spring actuated with provision included to soften the impact of termination, and includes a triggering means to stop and hold the reciprocative action after each cycle until released by trigger actuation. Also Salonen also has no teaching relative to an axially pivoting scissors head that is independently removable.

Moving onward in the prior art in United States Patent Application Number 2013/0000130 to Maniwa disclosed are electric scissors, a rotating motion of a motor is converted into a linear motion, and a link mechanism is operated to open and close blades by the linear motion, again wherein the closing force is increased when the blades are moved toward one another, similar to Ishiguro and Salonen. The electric scissors in Maniwa include a current control unit that controls an electric current value to the motor, and a detection unit that detects that an angle between the blades becomes a predetermined angle.

The current control unit in Maniwa changes an upper limit of the electric current value to be supplied to the motor when the detection unit detects that the angle between the blades becomes the predetermined angle, thus resulting in blade closing force control via motor current control and not having to have excessively strong linkage and blade components that would be required otherwise similar to the linkage action of bolt cutters that must withstand very high near blade closing cutting forces. Further, Maniwa also has no teaching relative to an axially pivoting scissors head that is independently removable.

Continuing, in the prior art in U.S. Pat. No. 3,787,742 to Murphy disclosed is an electric shear assembly in which there is provided a housing having swingably interconnected first and second cutting blades mounted therein and projecting outwardly therefrom. In Murphy, a gear train is mounted within the housing and is interconnected between a reversible electric motor and a second blade for moving the second blade with respect to said first blade, i.e. such that only the second blade is moving. Also in Murphy a manually manipulatable switch assembly is mounted on the housing and is coupled through a second switch assembly for actuating the motor to drive the gear train in a first direction to cause the cutting blades to open and close.

Further in Murphy a cam driven by the gear train is engagable with the second switch assembly for selectively opening and closing the assembly to control the motor to drive the gear train in a second direction for an interval sufficient to position the cutting blades in an open position and deactuate said motor. In Murphy a cam type arrangement is used to transmit motor rotational action to closing pivotal movement of the blade, requiring a motor to be reversible to go from blade closing movement to blade opening movement, wherein the blade closing movement for instance can be selectively stopped at any point to help prevent a finger injury from the closing blade, and by having a slow moving cutting stroke. Also, Murphy also has no teaching relative to an axially pivoting scissors head that is independently removable.

What is needed is a cutting apparatus that can accommodate on a functional output basis a high number of similar cutting tasks, however, without imparting excessive fatigue upon the operator of the cutting apparatus. Thus would be accomplished by de-coupling or buffering the functional end task of the cutting blades from the hand and wrist movement required of the cutting apparatus operator through variable structure to alter positional orientations as between the cutting blades and the operator's hand and wrist. Further desired would be structure to allow easy cleaning of the cutting blades to be able to keep them at their optimum cutting efficiency.

SUMMARY OF INVENTION

Broadly, the present invention is a cutting apparatus for trimming a selected portion from an article, the cutting apparatus including a power element that has a first end portion and an opposing second end portion with a longitudinal axis spanning therebetween. Wherein the first end portion has a reciprocating arm with a reciprocating movement and the second end portion is adapted to be grasped by a manual user's hand. The reciprocating arm having a first removably engagable rotatable couple with an annulus that is about the longitudinal axis and the first end portion having a first removably engagable interface structure. Further included in the cutting apparatus is a removable coupling having a primary end portion and an opposing secondary end portion with a lengthwise axis spanning therebetween, the primary end portion has a removably engagable rotatable couple second interface and the secondary end portion having a first slotted pivotal aperture.

Wherein the coupling transmits the reciprocating arm movement, also positionally the lengthwise axis and the longitudinal axis are coincident to one another. Further included is a removable cutting head assembly having a proximal end portion and an opposing distal end portion with a long axis spanning therebetween. The proximal end portion includes a fourth removable engagable interface structure that removably engages with the first removable engagable structure, the distal end portion having a pair of cutting blades that each have a free end portion and an opposing linkage first pivotal connection with a mid-blade section therebetween. The mid-blade portions have the first pivotal connection to one another, wherein the first pivotal connection has a first pivotal axis, the cutting blade free end portions having a scissor type movement in a first plane.

Wherein the first pivotal connection is attached to the cutting head assembly distal end portion through a rotatable pivot head, the pair of intermediate linkages each have a second pivotal connection, the pair of intermediate linkages are also pivotally attached to a third pivotal connection of the removable coupling first slotted pivotal aperture.

Operationally, the reciprocating arm drives through the removable coupling to the pair of intermediate linkages and the cutting blades such that the cutting blade free end portions have the scissor movement from the first pivotal connection to the cutting blade free ends that are functional to cut the article. Further the cutting head assembly is selectably rotatable in a circular movement in an indexable rotationally locked manner about the longitudinal axis. Thus allowing the first, second, and third pivotable axes to rotate about the longitudinal axis allowing the scissor type movement in the first plane to be selectively rotatable about the longitudinal axis, further the cutting head assembly and the coupling are removably engagable from the power element for cleaning.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 3 shows a side elevation cross section from FIG. 1, giving detail of the straight power element along the longitudinal axis, wherein FIG. 3 shows detail of the power element with the reciprocating arm having reciprocating movement as driven by the electric drive motor, the rotational axis of the motor, the cam drive element, the reciprocating arm that is slidably engaged to the bushing guide, and the first removably engagable interface structure;

REFERENCE NUMBERS IN DRAWINGS

Figure 1:
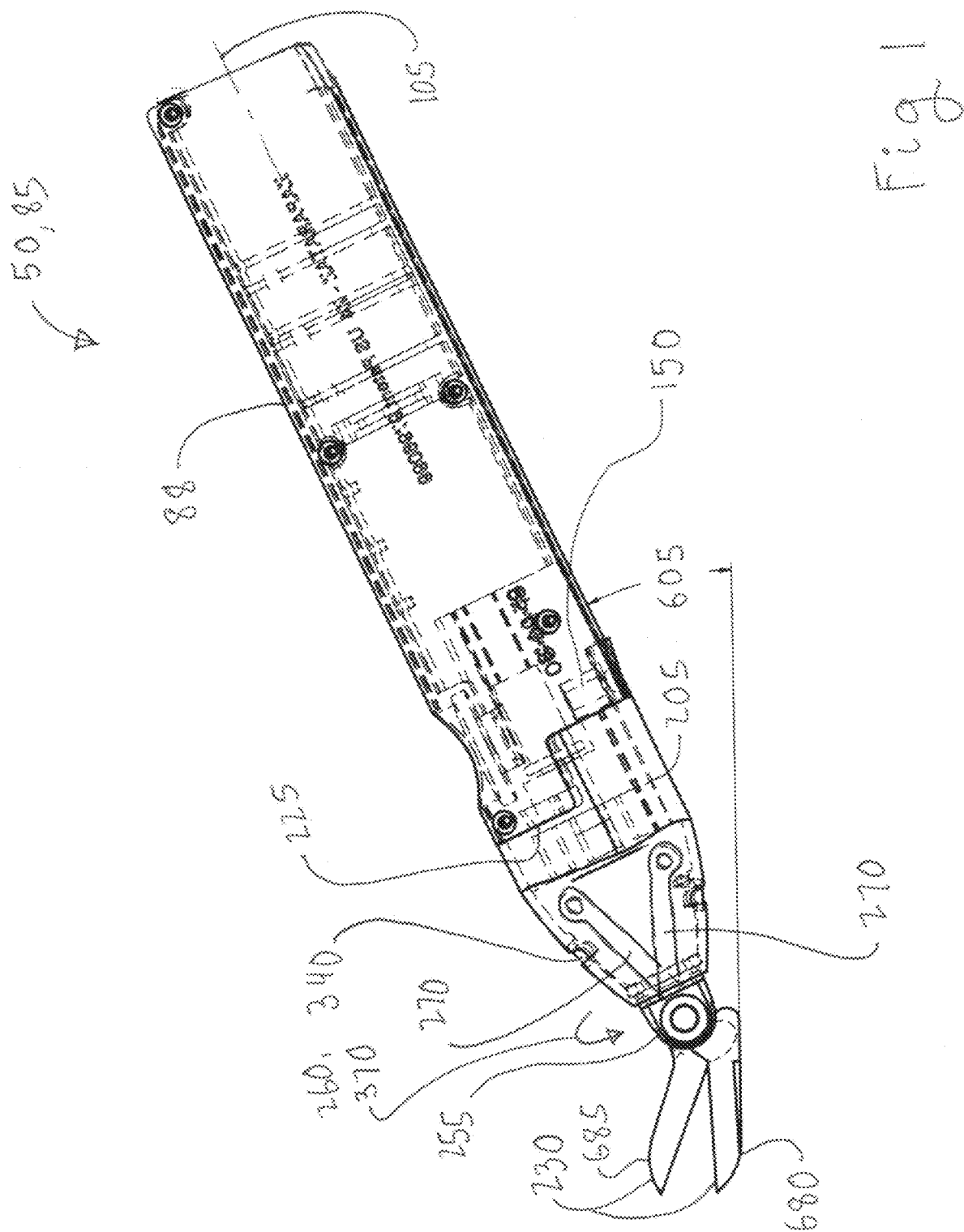
FIG. 1 shows a side elevation view of the cutting apparatus that includes a power element, a first end portion of the power element, a second end portion of the power element, a portion of the power element adapted to be grasped by a user's hand, a longitudinal axis of the power element with a first removably engagement structure that is interfaced with a fourth removably engagable interface structure of a removable cutting head assembly that has a rotatable pivot head, plus a means for selectable rotationally locking a circular movement of the rotatable pivot head, also shown are the cutting blades.

50 Cutting apparatus
55 Manual user of the cutting apparatus 50
60 Hand of the user 55
65 Wrist of the user 55
70 Article
75 Trimming the article 70
80 Selected portion of the article 70 to be trimmed 75
85 Power element
86 Power element being straight along longitudinal axis 105
88 Housing of power element 86
90 First end portion of the power element 85
91 Rotation stop surface of housing 89
95 Second end portion of the power element 85
100 Adapting to be grasped by the user's hand 60 of the second end portion 95
105 Longitudinal axis of the power element 85
110 Reciprocating arm of the power element 85
115 Annulus of the reciprocating arm 110
120 Cantilever section of the reciprocating arm 110
125 Opposing end portion of the cantilever section 120 of the reciprocating arm 110
130 Bushing guide affixed to the second end portion 95
135 Slidable engagement of the reciprocating arm 110, 111 to the bushing guide 130 to maintain reciprocating movement 140
140 Movement of the reciprocating arm 110, 111 to transmit axial force
145 First removably engagable rotatable couple of the cantilever section 120
150 First removably engagable interface structure
155 Removable coupling
160 Primary end portion of the coupling 155
165 Secondary end portion of the coupling 155
170 Lengthwise axis on the coupling 155
175 Second interface of the removable coupling 155 that is removably engagable rotationally free about the longitudinal axis 105 of the coupling 155
180 T-slot positioned perpendicular to the lengthwise axis 170 of the second interface 175
185 Single outward radially oriented opening of the second interface 175
190 First slotted pivotal aperture of the coupling 155
195 Transmission of the reciprocating axial force through movement 140 at the coupling 155
200 Coincident position of the lengthwise axis 170, the longitudinal axis 105, and the long axis 220 to one another
205 Removable cutting head assembly
210 Proximal end portion of the removable cutting head assembly 205
215 Distal end portion of the removable cutting head assembly 205
220 Long axis of the removable cutting head assembly 205
225 Fourth removably engagable interface structure
230 Pair of open cutting blades
235 Straight extension outward of the pair of open cutting blades 230
245 Free end portion of the cutting blades 230
250 Pivotally attached portion of the cutting blades 230
255 Rotatable pivot head
256 Rotatable pivot head with the lower cutting blade guide 610
260 Rotation of the pivot head 255
265 Third interface structure of the rotatable couple of the rotatable pivot head 255
270 Mid-blade section of the cutting blades 230
275 Second pivotal connection
280 Second pivotal axis of the second pivotal connection 275
285 Pair of intermediate linkages
290 Third pivotal connection
295 Third pivotal axis of the third pivotal connection 290
300 Loop structure for slidably engaging the removable coupling 155 to maintain the reciprocating movement 140
305 First pivotal connection
310 First pivotal axis of the first pivotal connection 305
315 First plane
320 Flat first plane
330 Scissor type movement of the free end portion 245 of the cutting blades 230 in the first plane 315
335 Selectably cutting the article 70 with the scissors movement 330
340 Means for selectably rotationally locking the circular movement 370 in a plurality of angular positions
345 Flexible extension
350 Fastener receiver of the flexible extension 345
355 Second aperture
360 Frictional projection of the clamp fastener 365 therethrough the second aperture 355
365 Clamp fastener of the received 350 to the second aperture 355
370 Circular rotational movement of the first 310, second 280, and third 295 pivotal axes about the longitudinal axis 105
375 Light
380 Beam of light of the light 375
385 Third aperture
390 Electrical drive motor
395 Rotational axis of the electrical drive motor 390
400 Cam drive drum element for transmitting motor 390 rotation about rotational axis
395 to reciprocating motion 140 of arm 110
401 Barrel cam element
402 Barrel cam channel of the barrel cam 401
403 Cam drive channel of the cam drive element 400
410 Means for anti rotation about longitudinal axis 105 of the reciprocating arm 110
411 Receiving slot disposed in the power element 86 housing 88 for the means 410 that precludes rotation about longitudinal axis 105 of the reciprocating arm 110 while allowing reciprocating movement 140 of the arm 110

412 Means 410 is preferably a first pin 413 disposed therethrough the arm 110 with a first ball bearing 414 positioned external to the arm 110 that is received in slot 411
413 First pin
414 First ball bearing
415 Means to connect the motor 390 rotation about rotational axis 395 into reciprocating movement 140 of the arm 110 via the first ball bearing 414 riding in the channel 403
416 Second pin
445 Normally open switch
600 Threaded inside aperture
605 Cutting plane first acute angle to the horizontal plane
610 Lower cutting blade guide extension
611 Proximal end portion of the lower cutting blade guide extension 610
612 Distal end portion of the lower cutting blade guide extension 610
613 First margin of the lower cutting blade guide extension 610
614 First planar area of the first margin 613
615 Arcuate ramp guide surface
616 Second margin of the lower cutting blade guide extension 610
620 Open channel for blade 230, 680 movement 330
625 Electrical communication post rotates one full turn to lock for both a power cord post
635 and a rechargeable battery pack 655
630 Means for removable engagement and electrical communication of the power cord post 635 to the second end portion 95 of the power element 85, wherein the power cord post 635 is for electrical power from a wall electrical plug or for the rechargeable battery pack 655 in either case to provide electrical power for the cutting apparatus 50
635 Power cord post
640 Housing being the second end portion 95 of the power element 85 electrical power interface
645 Barrell jack that is preferably about 2.1 mm in diameter for the means 630
650 Power cord post 635 cord for power electrical communication to a wall outlet
655 Battery pack that is preferably rechargeable
660 Recharge port of the battery pack 655
665 Printed circuit board control circuitry
670 Rotational protrusion
675 Helical receiving annulus for the rotational protrusion 670
680 Cutting blade 230 lower
685 Cutting blade 230 upper

DETAILED DESCRIPTION

With initial reference to FIG. 1 shown is a perspective view of the cutting apparatus 50 that includes the power element 85, a first end portion 90 of the power element 85, a second end portion 95 of the power element 85, a portion of the power element 85 adapted 100 to be grasped by a user's hand 60, and a longitudinal axis 105 of the power element 85. Further, FIG. 1 shows the first removably engagement structure 150 that is interfaced with a fourth removably engagable interface structure 225 of the cutting head assembly 205 that includes the rotatable pivot head 255, the means 340 for selectable rotationally locking the circular movement 370, the cutting blades 230.

Figure 2:
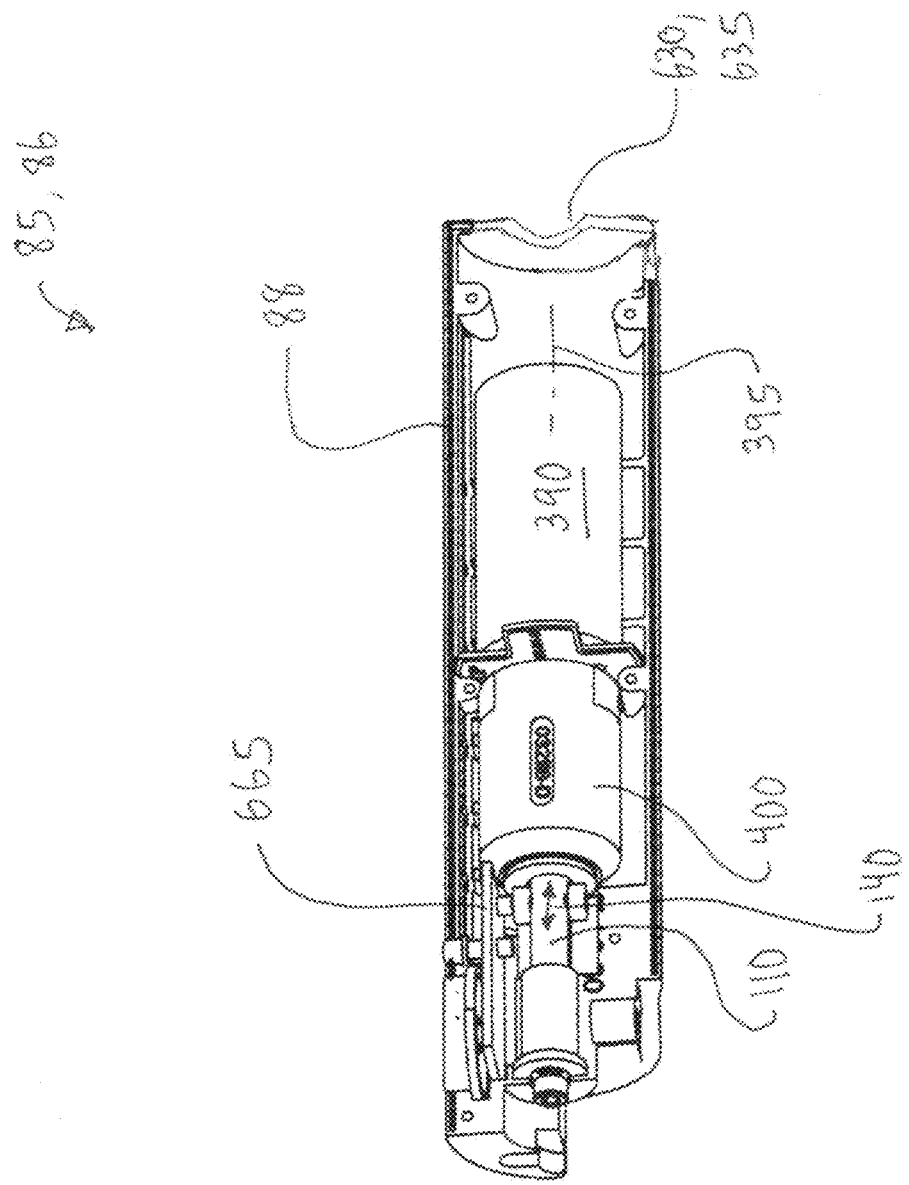
FIG. 2 shows a partial cross section view 2-2 from FIG. 6 that includes the power element housing, the motor, the cam drive, and the printed circuit board.
Figure 6:
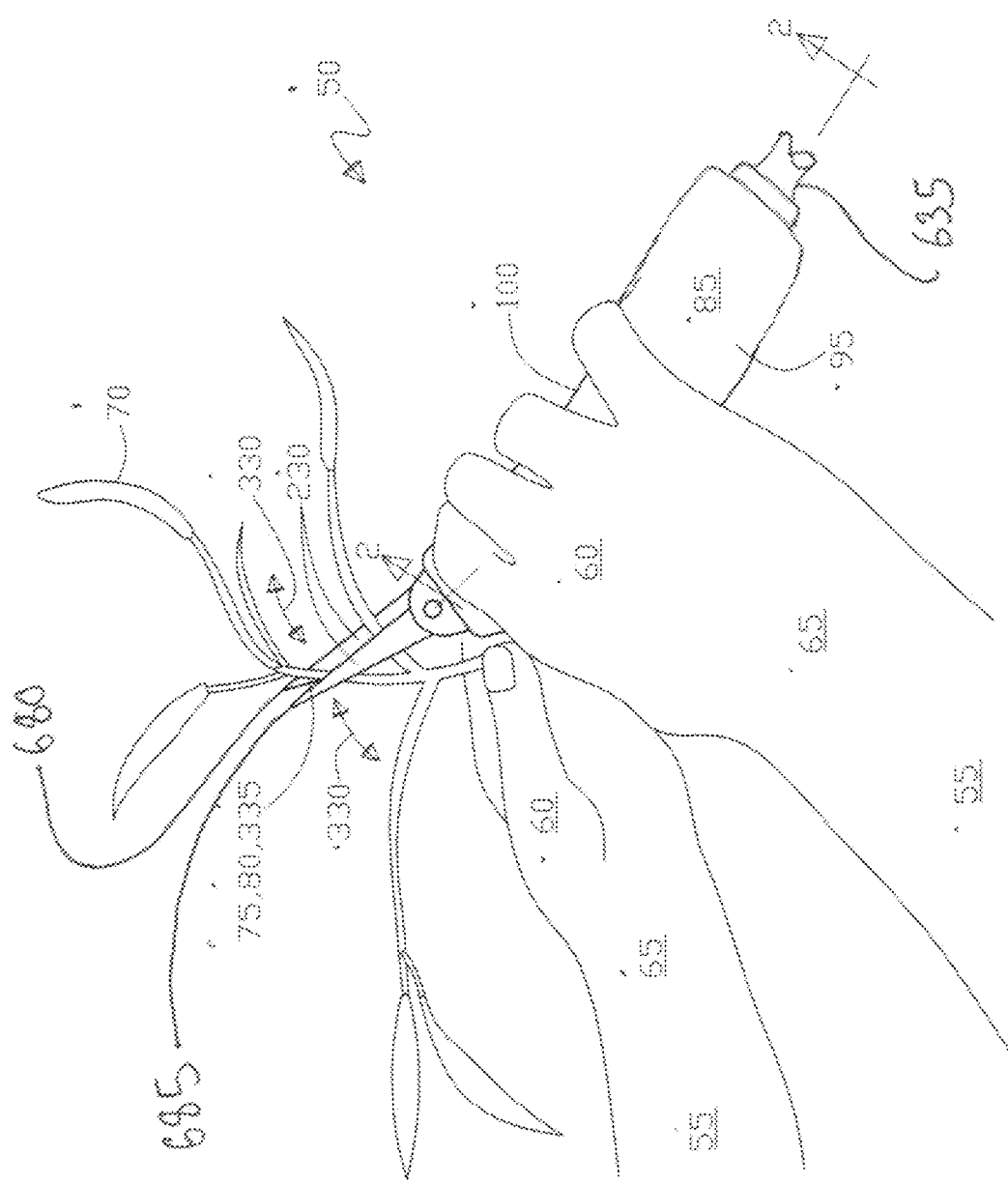
FIG. 6 shows a use drawing of the cutting apparatus with a manual user using their hands from their wrists to manually grasp the second end portion of the power element of the cutting apparatus while using their other hand to grasp the article to be trimmed in a selected portion location using the pair of open cutting blades with their scissor type movement.

Next, FIG. 2 shows a partial cross section view 2-2 from FIG. 6 that includes the power element housing 88, the motor 390, the cam drive 400, and the printed circuit board 665.

Figure 3:
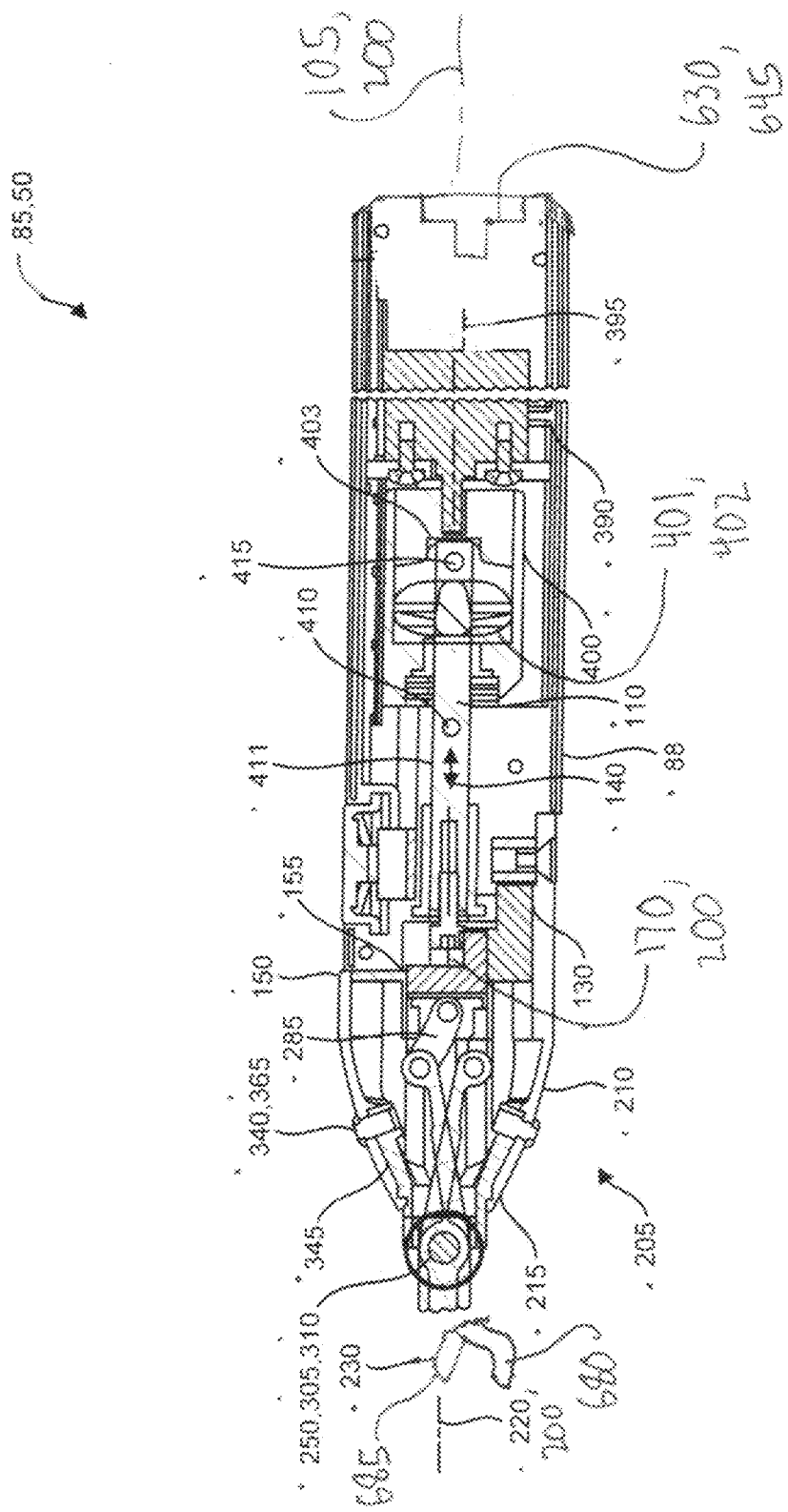

Continuing, FIG. 3 shows a side elevation cross section from FIG. 1, giving detail of the straight power element 86 along the longitudinal axis 105, wherein FIG. 3 shows detail of the power element 86 with the reciprocating arm 110 having reciprocating movement 140 as driven by the electric drive motor 390, the rotational axis 395 of the motor 390, the cam drive element 400, the reciprocating arm 110 that is slidably engaged 135 to the bushing guide 130, and the first removably engagable interface structure 150.

Figure 4:
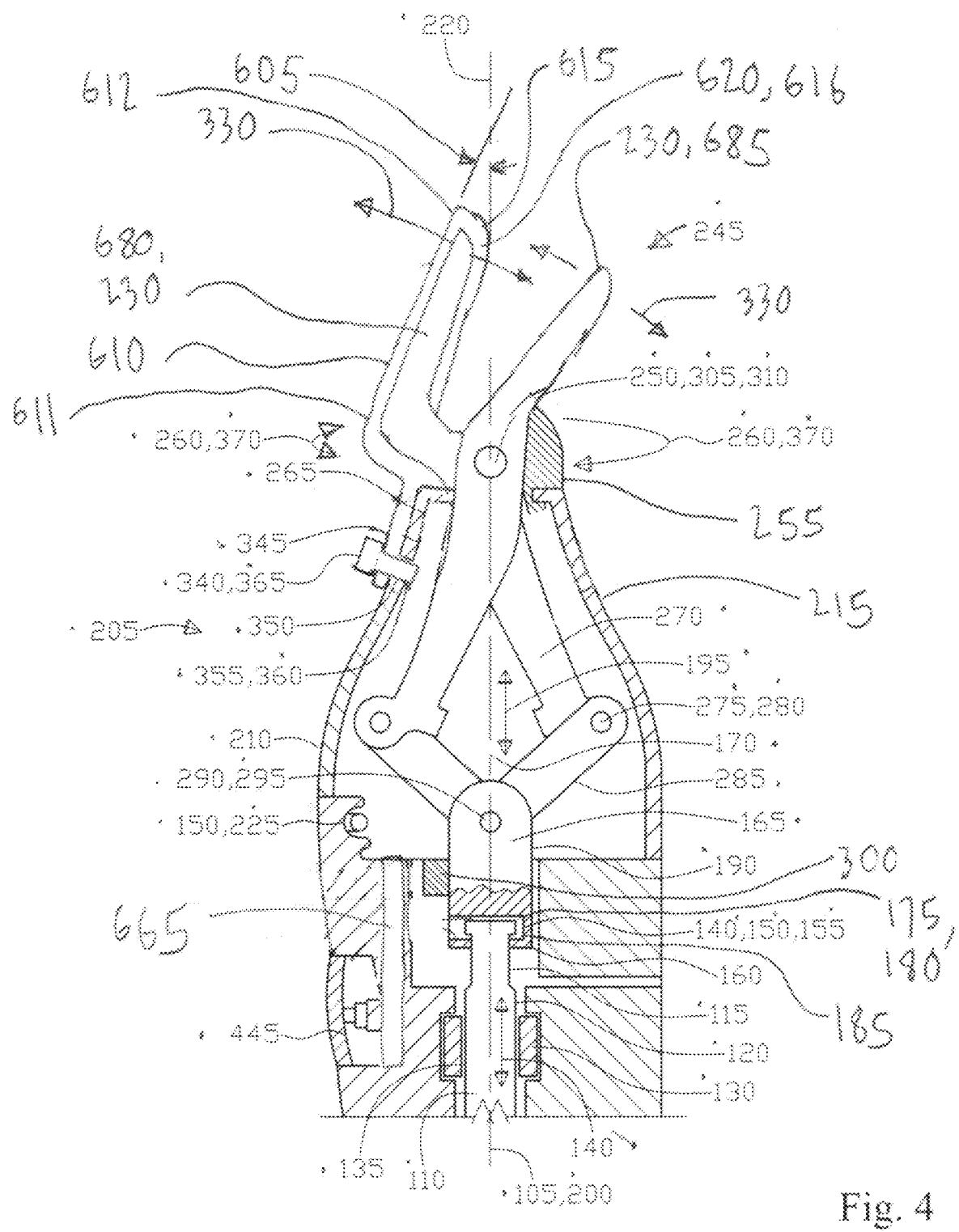
FIG. 4 is cross section 4-4 from FIG. 9 showing the removable cutting head assembly, the distal end portion of the cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement, the fourth removably engagable interface structure, a second interface of the removable coupling, a first slotted pivotal aperture of the removable coupling, a third pivotal connection, a pair intermediate linkages, a mid blade section of the cutting blades, the transmission of the reciprocating axial force movement from the reciprocating arm, to the removable coupling, to the pair intermediate linkages at the third pivotal connection, to the second pivotal connection to the mid-blade section of the cutting blades, through a first pivotal connection, and finally to the pair of cutting blades that creates scissors type movement at the free end portion of the cutting blades that extend in a flat first plane, and the circular rotational movement about the longitudinal axis for the rotatable pivot head.
Figure 9:
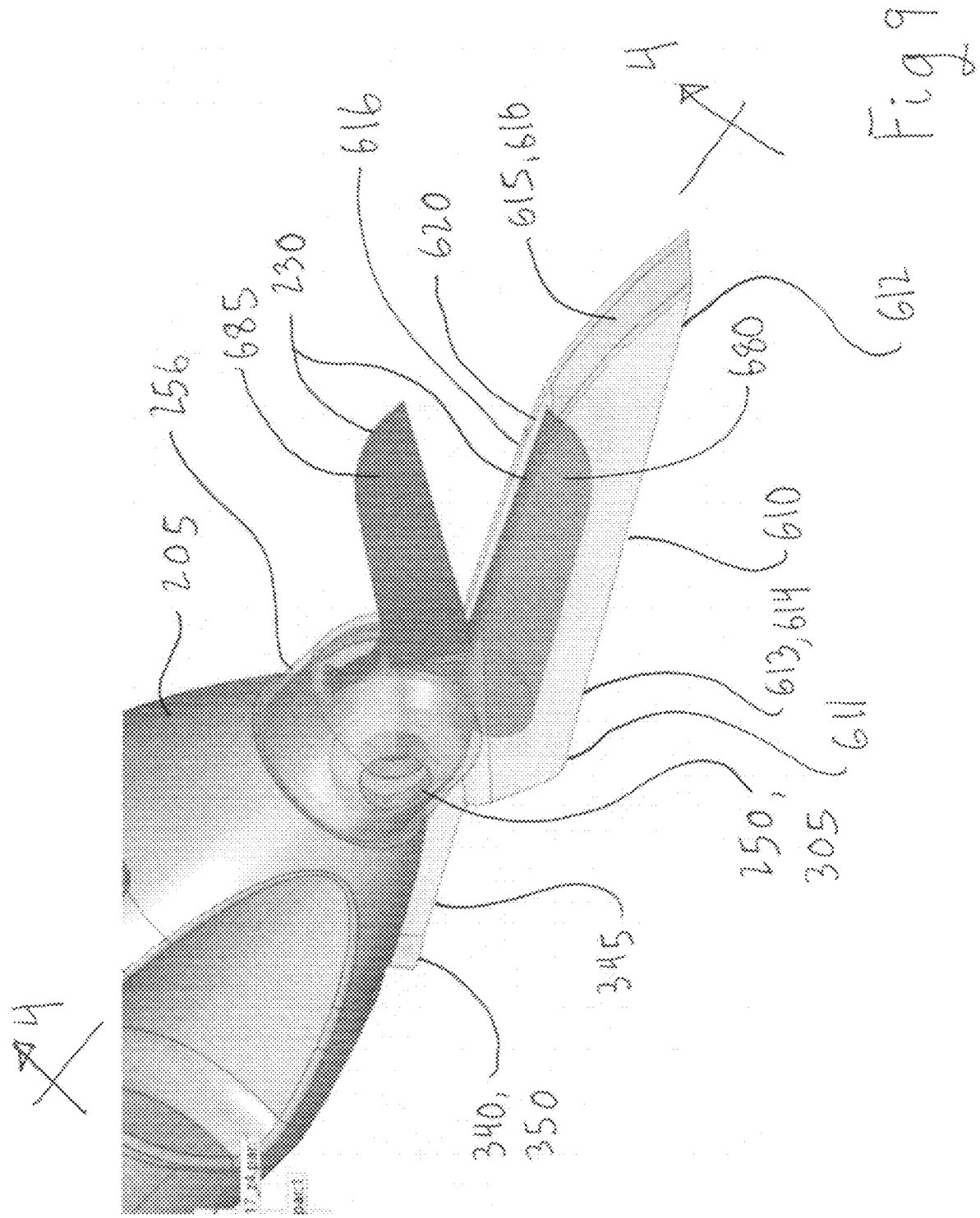
FIG. 9 shows a perspective view of the cutting head assembly that includes the rotatable pivot head, the cutting blades, and the lower cutting blade guide.

Next, FIG. 4 is cross section 4-4 from FIG. 9 showing the removable cutting head assembly 205, the distal end portion 215 of the removable cutting assembly 205, the proximal end portion 210 of the removable cutting assembly 205, the movement 140 of the reciprocating arm 110 from the power element 85, the reciprocating arm 110, the longitudinal axis 105 of the power element 85, and the lengthwise axis 170 of the removable coupling 155.

Further, FIG. 4 shows the coincident position 200 of the lengthwise axis 170 and the longitudinal axis 105, the first end portion 90 of the power element 85, the removable coupling 155, the primary end portion 160 of the removable coupling 155, the secondary end portion 165 of the removable coupling 155, a second interface 175 for the first removably engagable rotatable couple 145, the means 340 for selectable rotationally locking the circular movement 370, the fourth removably engagable interface structure 225, a second interface 175 of the removable coupling 155, and a first slotted pivotal aperture 190 of the removable coupling 155.

Also, FIG. 4 shows a third pivotal connection 290, a pair of intermediate linkages 285, a mid-blade section 270 of the cutting blades 230, the transmission of the reciprocating axial force movement 140 from the reciprocating arm 110, to the removable coupling 155, to the pair intermediate linkages 285 at the third pivotal connection 290, to the second pivotal connection 275 to the mid-blade section 270 of the cutting blades 230, through the first pivotal connection 305, and finally to the pair of cutting blades 230 that creates scissors type movement 330 at the free end portion 245 of the cutting blades 230, and the circular rotational movement 370 about the longitudinal axis 105 for the rotatable pivot head 255. Also FIG. 4 shows the lower cutting blade guide is shown 610.

Figure 5:
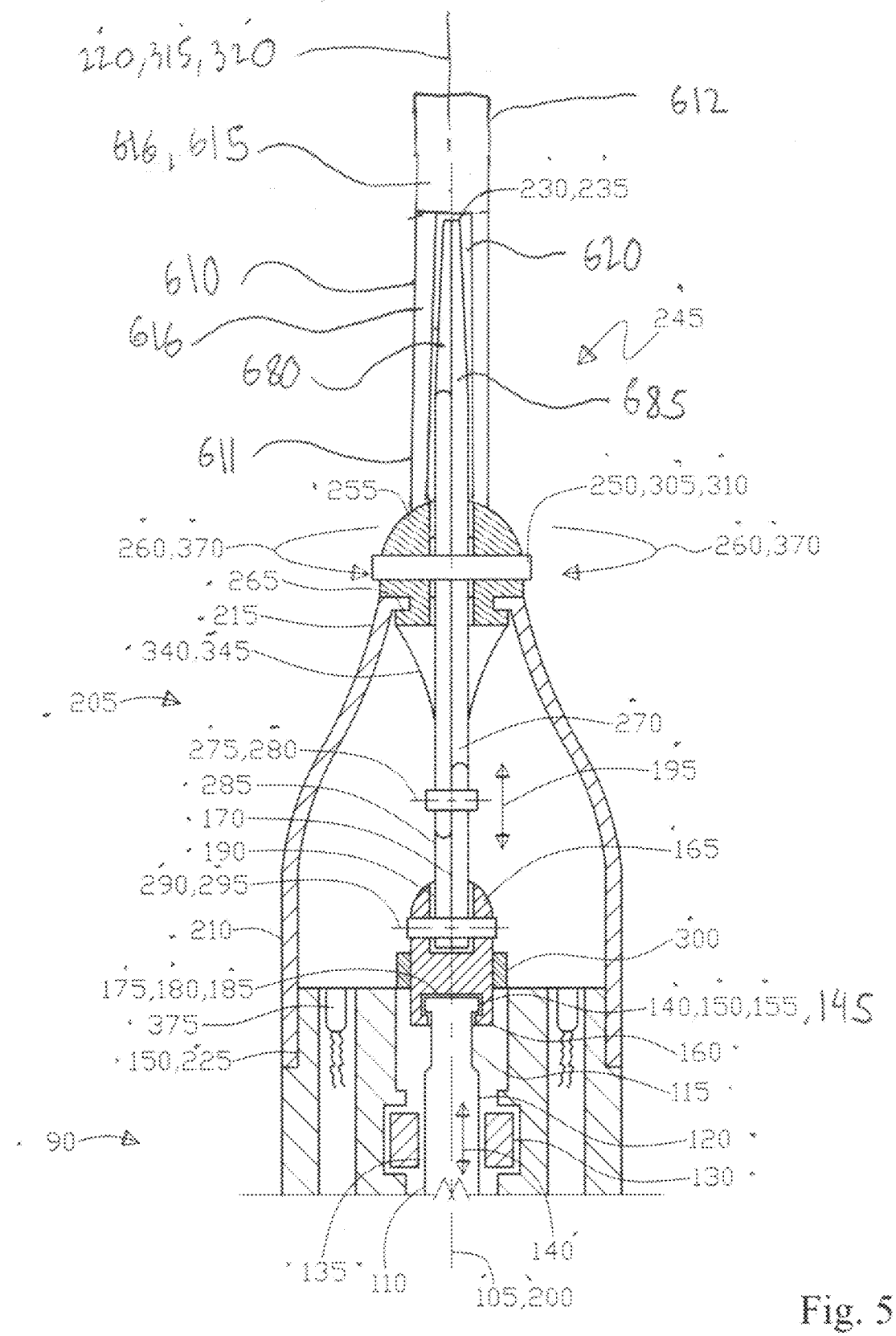
FIG. 5 is cross section 5-5 from FIG. 1 essentially showing FIG. 4 rotated ninety degrees, with FIG. 5 showing the removable cutting head assembly, the distal end portion of the cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement and the flexible extension, the fourth removably engagable interface structure, a second interface of the removable coupling, a first slotted pivotal aperture of the removable coupling, a third pivotal connection, a pair intermediate linkages, a mid blade section of the cutting blades, the transmission of the reciprocating axial force movement from the reciprocating arm, to the removable coupling, to the pair intermediate linkages at the third pivotal connection, to the second pivotal connection to the mid-blade section of the cutting blades, through a first pivotal connection, and finally to the pair of cutting blades that creates scissors type movement at the free end portion of the cutting blades that extend in a flat first plane, and the circular rotational movement about the longitudinal axis for the rotatable pivot head.

Further, FIG. 5 is cross section 5-5 from FIG. 1, essentially showing FIG. 4 rotated ninety degrees, with FIG. 5 showing the removable cutting head assembly 205, the distal end portion 215 of the removable cutting assembly 205, the proximal end portion 210 of the removable cutting assembly 205, the movement 140 of the reciprocating arm 110 from the power element 85, the reciprocating arm 110, the longitudinal axis 105 of the power element 85, and the lengthwise axis 170 of the removable coupling 155. Further, FIG. 5 shows the coincident position 200 of the lengthwise axis 170 and the longitudinal axis 105, the first end portion 90 of the power element 85, the removable coupling 155, the primary end portion 160 of the removable coupling 155, the secondary end portion 165 of the removable coupling 155, a second interface 175 for the first removably engagable rotatable couple 145, the means 340 for selectable rotationally locking the circular movement 370 and the flexible extension 345, the fourth removably engagable interface structure 225, a second interface 175 of the removable coupling 155, and a first slotted pivotal aperture 190 of the removable coupling 155.

Also, FIG. 5 shows, a third pivotal connection 290, a pair intermediate linkages 285, a mid-blade section 270 of the cutting blades 230, the transmission of the reciprocating axial force movement 140 from the reciprocating arm 110, to the removable coupling 155, to the pair intermediate linkages 285 at the third pivotal connection 290, to the second pivotal connection 275 to the mid-blade section 270 of the cutting blades 230, through the first pivotal connection 305, and finally to the pair of cutting blades 230 that creates scissors type movement 330 at the free end portion 245 of the cutting blades 230 that extend in a flat 320 first 315 plane, and the circular rotational movement 370 about the longitudinal axis 105 for the rotatable pivot head 255. Also FIG. 5 shows the lower cutting blade guide is shown 610.

Further, FIG. 6 shows a use drawing of the cutting apparatus 50 with a manual user 55 using their hands 60 from their wrists 65 to manually grasp 100 the second end portion 95 of the power element 85 of the cutting apparatus 50 while using their other hand 60 to grasp 100 the article 70 to be trimmed 75 in a selected 335 portion 80 location using the pair of open cutting blades 230 with their scissor type movement 330.

Figure 7:
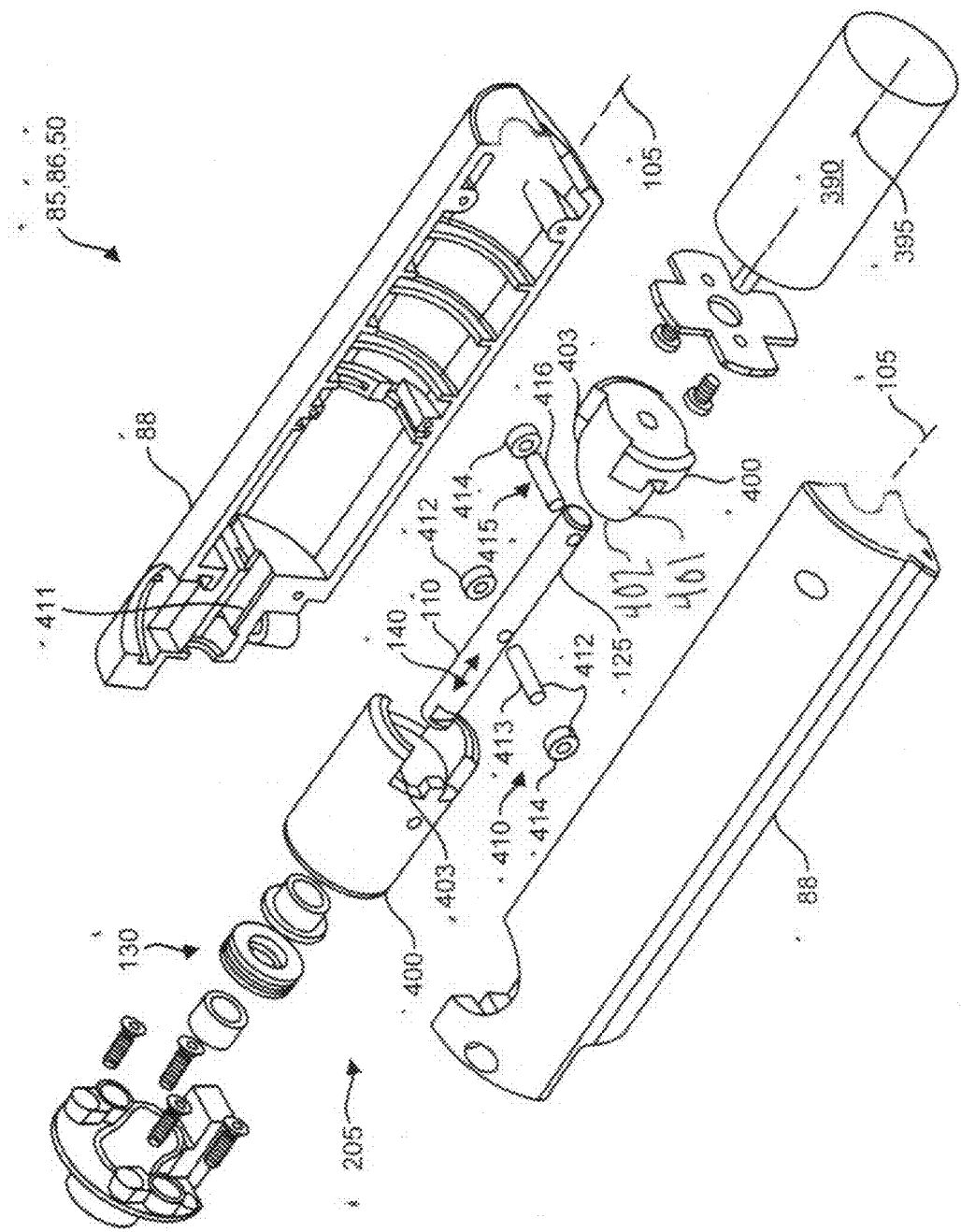
FIG. 7 is an exploded perspective view of the straight power element including the motor, the cam drive element, the reciprocating arm having reciprocating movement within the bushing guide, all being disposed within the straight housing.

Further, FIG. 7 is an exploded perspective view of the straight power element 86 including the motor 390, the cam drive element 400, the reciprocating arm 110 having reciprocating movement 140 within the bushing guide 130, all being disposed within the straight housing 88.

Figure 8:
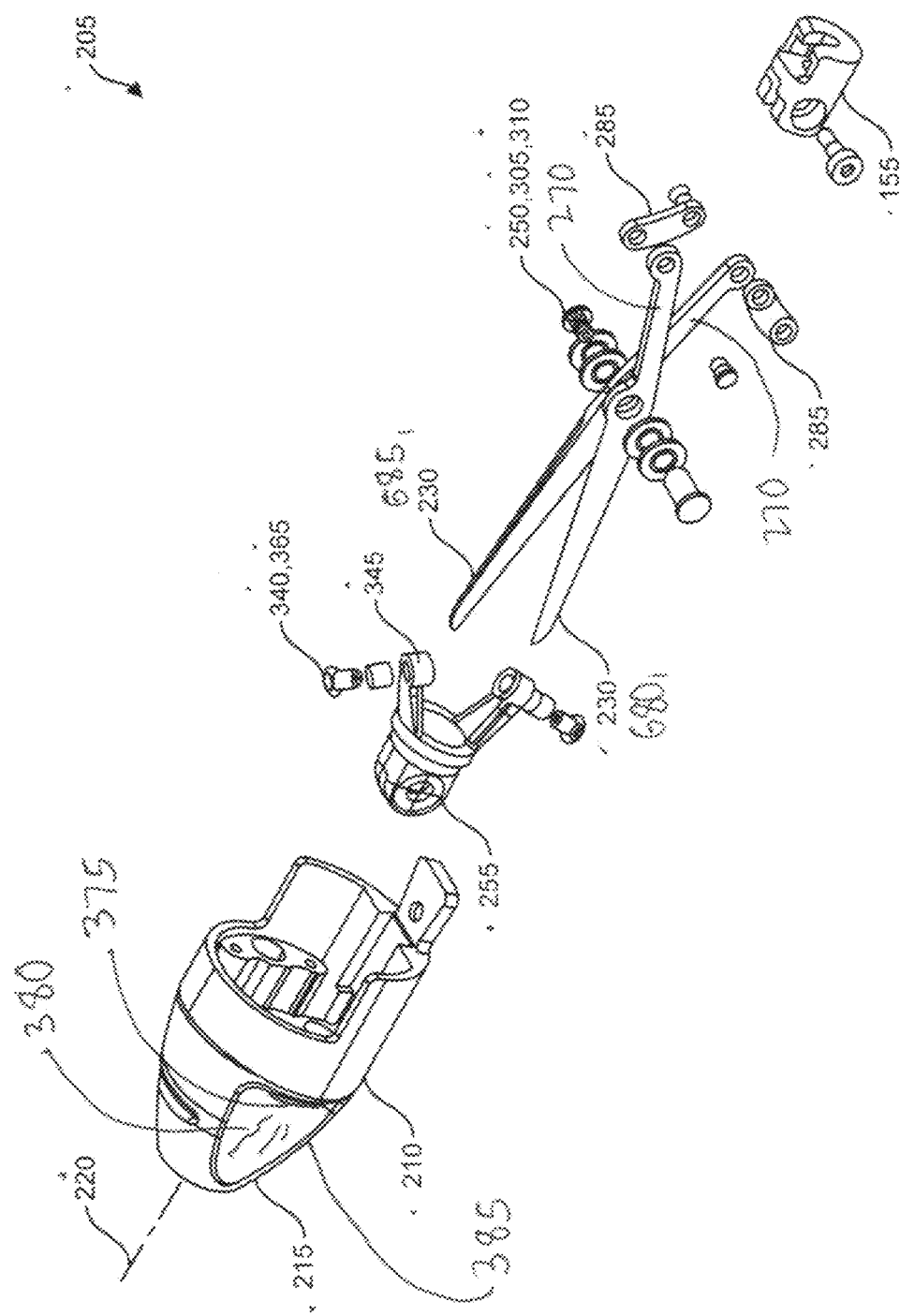
FIG. 8 is an exploded perspective view of the removable cutting head assembly in particular that includes the pair of cutting blades with the pivotal attachment, the intermediate linkages, the removable coupling (that axially connects to the reciprocating arm 110, 111 not shown), the rotatable pivot head, with the proximal and distal end portions of the removable cutting head assembly.

Moving onward, FIG. 8 is an exploded perspective view of the removable cutting head assembly 205 in particular that includes the pair of cutting blades 230 with the pivotal attachment 250, 305, 310, the intermediate linkages 285, the removable coupling 155 (that axially connects to the reciprocating arm 110, 111 not shown), the rotatable pivot head 255, with the proximal 210 and distal 215 end portions of the removable cutting head assembly 205.

Next, FIG. 9 shows a perspective view of the cutting head assembly 205 that includes the rotatable pivot head 256, the cutting blades 230, and the lower cutting blade guide 610.

Figure 10:
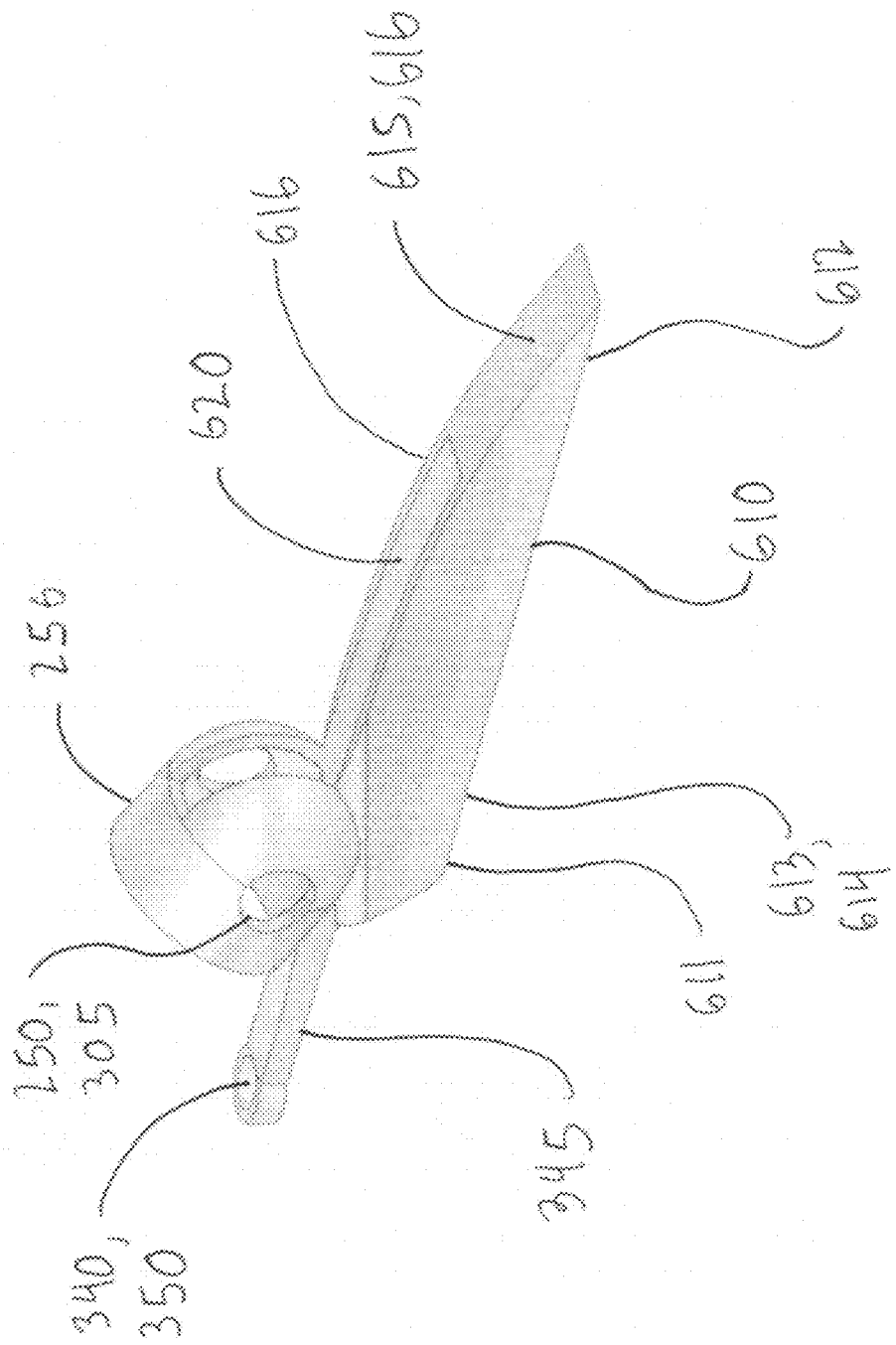
FIG. 10 shows a perspective view of the rotatable pivot head, the lower cutting blade guide, the ramp guide surface, the channel, and the flexible extension.

Continuing, FIG. 10 shows a perspective view of the rotatable pivot head 256, the lower cutting blade guide 610, the ramp guide surface 615, the channel 620, and the flexible extension 345.

Figure 11:
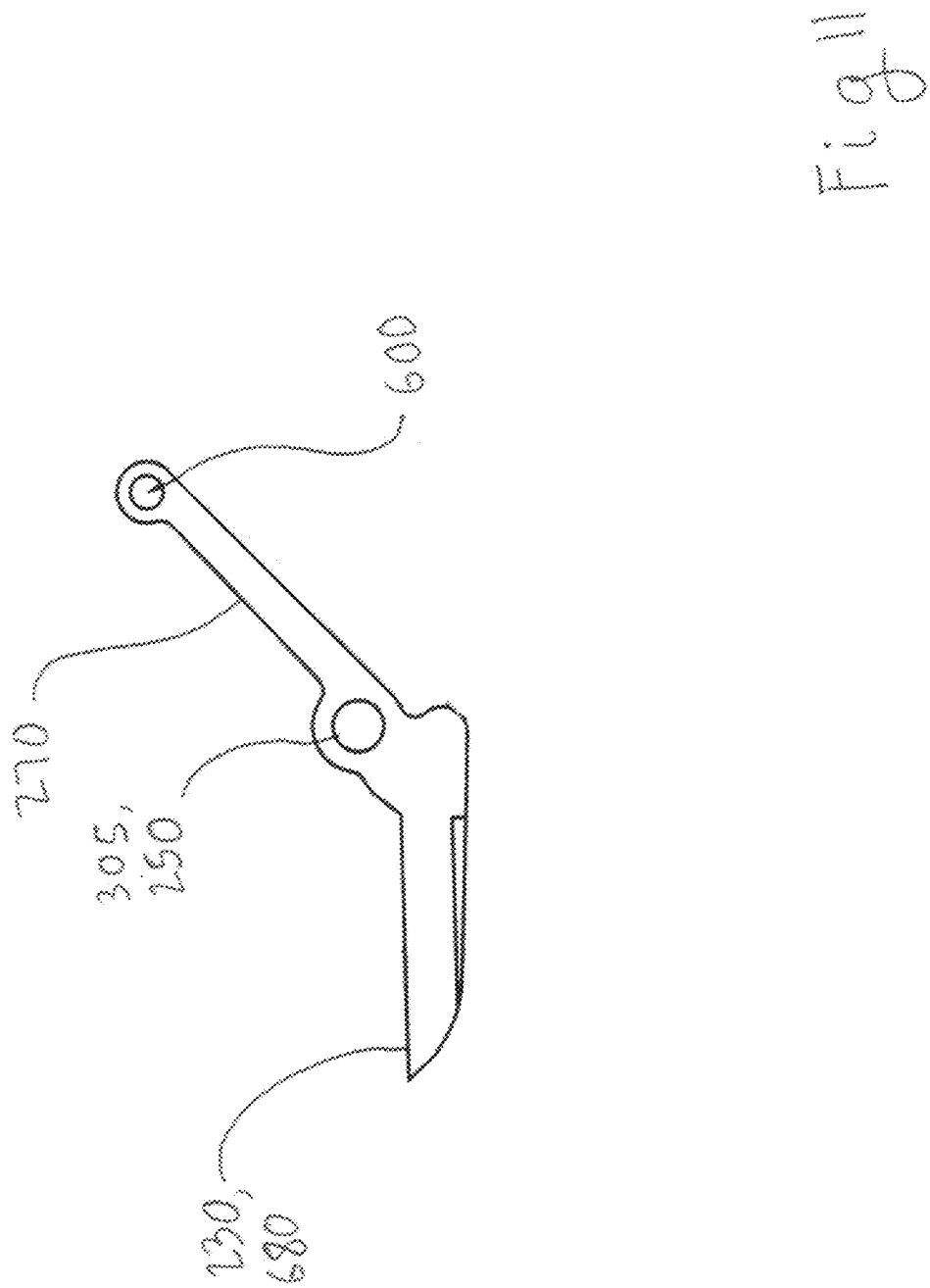
FIG. 11 shows a side elevation view of the lower cutting blade including the pivotal portion, the mid blade section, and the threaded attachment.

Further, FIG. 11 shows a side elevation view of the lower 680 cutting blade 230 including the pivotal portion 250, the mid blade section 270, and the threaded attachment 600.

Figure 12:
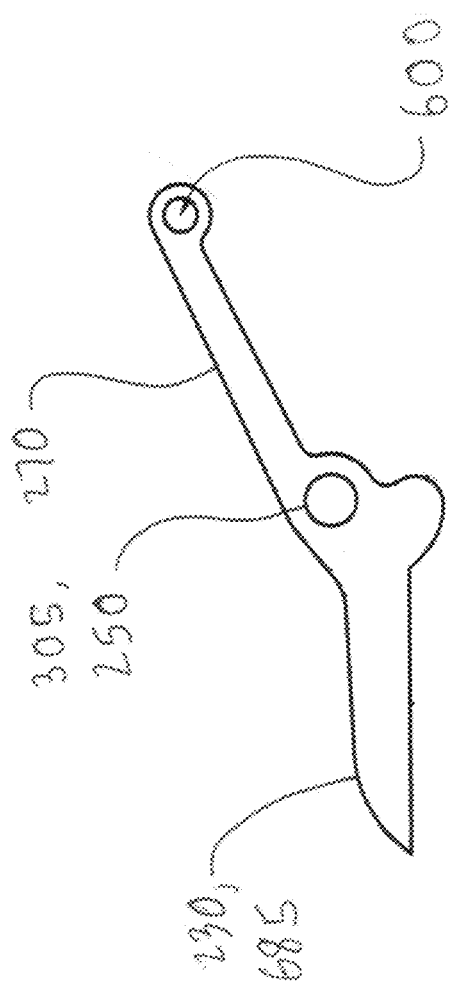
FIG. 12 shows a side elevation view of the upper cutting blade including the pivotal portion, the mid blade section, and the threaded attachment.

Moving onward, FIG. 12 shows a side elevation view of the upper 685 cutting blade 230 including the pivotal portion 250, the mid blade section 270, and the threaded attachment 600.

Figure 13:
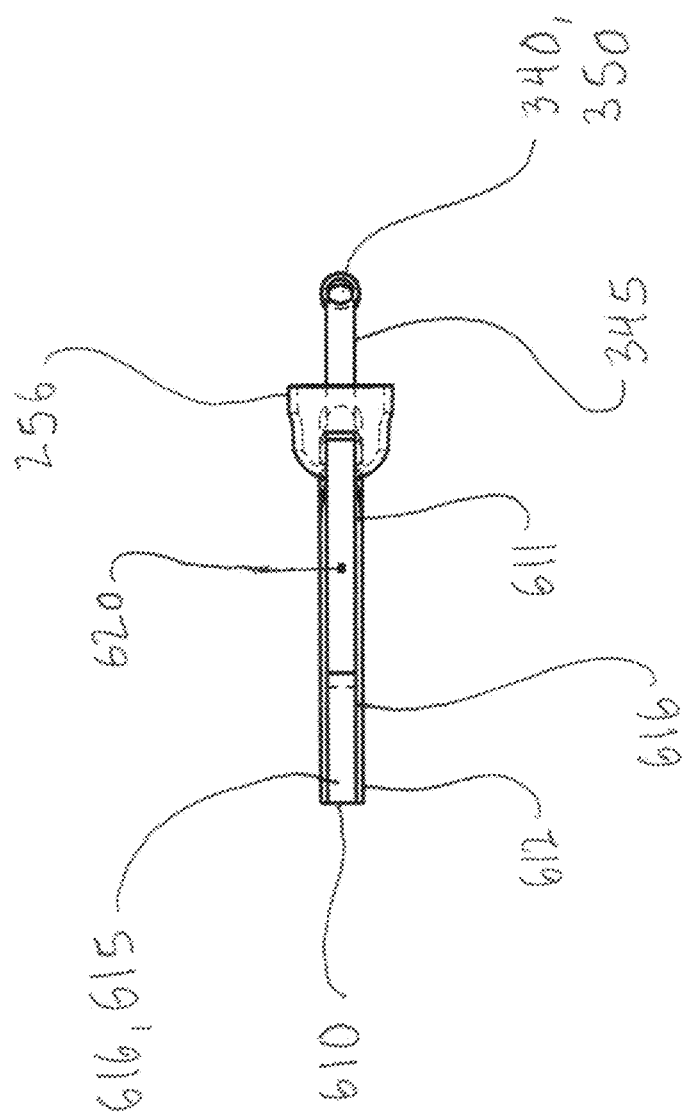
FIG. 13 shows a plan view of the rotatable pivot head, the lower cutting blade guide, the ramp guide surface, the channel, and the flexible extension.

Continuing, FIG. 13 shows a plan view of the rotatable pivot head 256, the lower cutting blade guide 610, the ramp guide surface 615, the channel 620, and the flexible extension 345.

Figure 14:
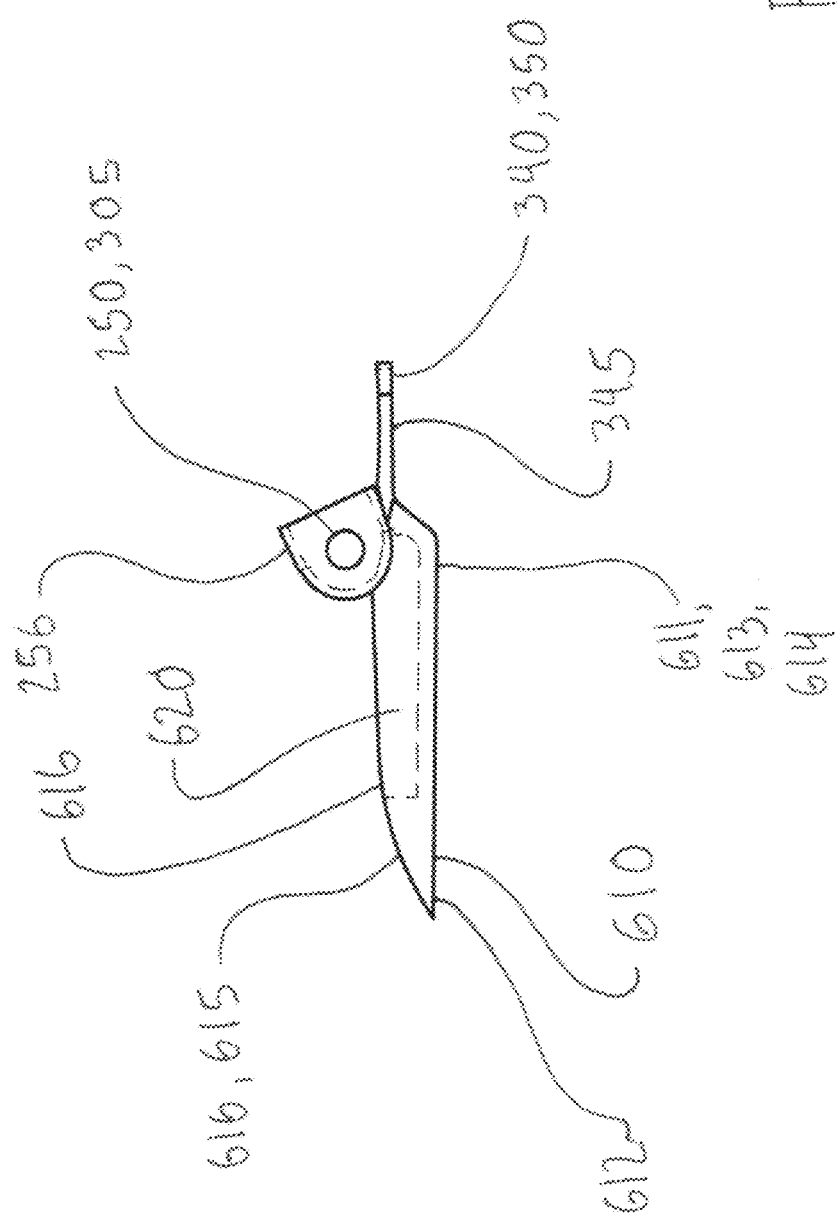
FIG. 14 shows a side elevation view of the rotatable pivot head, the lower cutting blade guide, the ramp guide surface, the channel, and the flexible extension.

Next, FIG. 14 shows a side elevation view of the rotatable pivot head 256, the lower cutting blade guide 610, the ramp guide surface 615, the channel 620, and the flexible extension 345.

Figure 15:
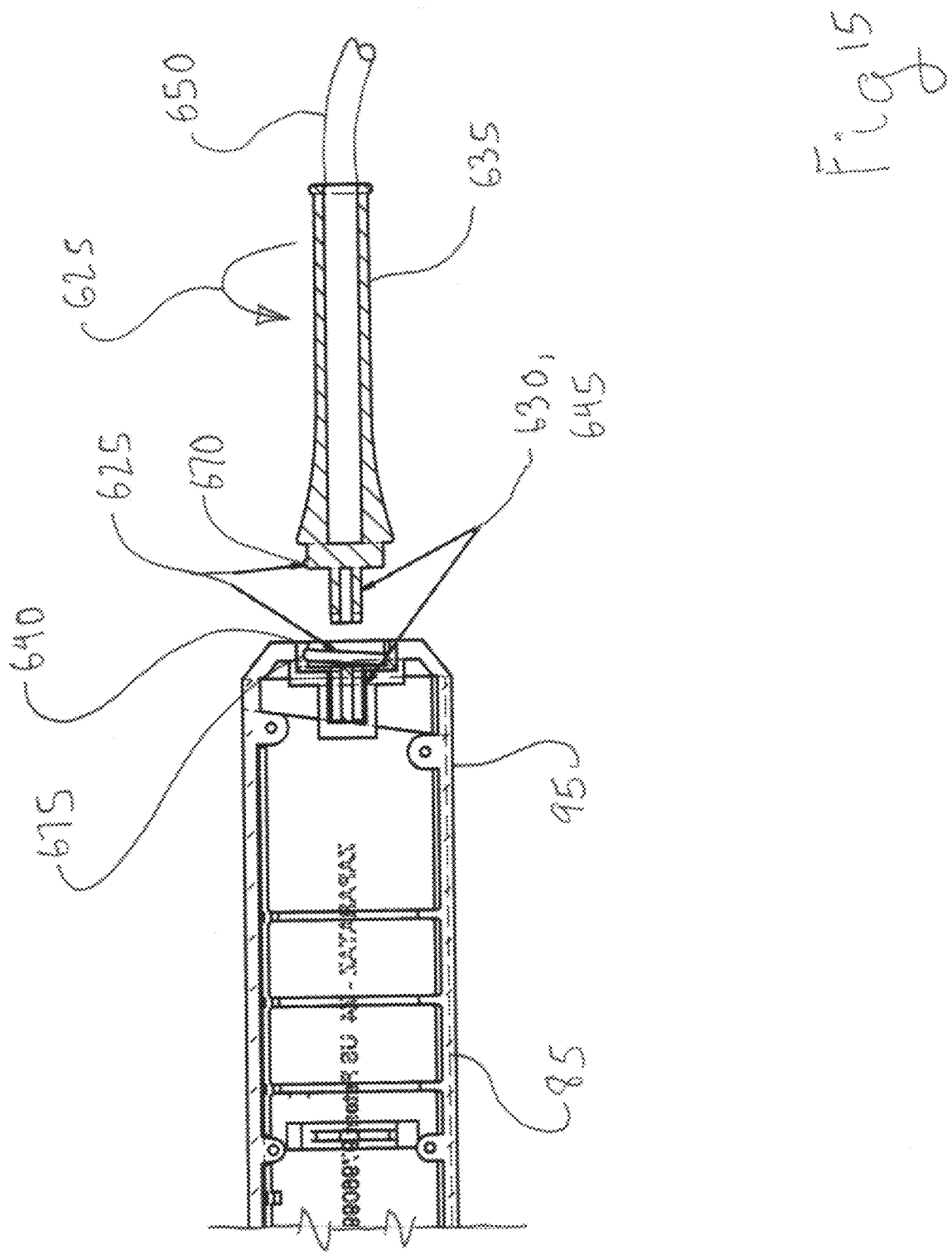
FIG. 15 shows a side elevation view of the second end portion of the power element that specifically shows the removably engageable power cord post that rotationally engages into a helical annulus that receives the protrusion with a rotational lock arrangement.

Further, FIG. 15 shows a side elevation view of the second end portion 95 of the power element 85 that specifically shows the removably engageable 630 power cord post 635 that rotationally engages 625 into a helical annulus 675 that receives a protrusion 670 with a rotational lock arrangement 625.

Figure 16:
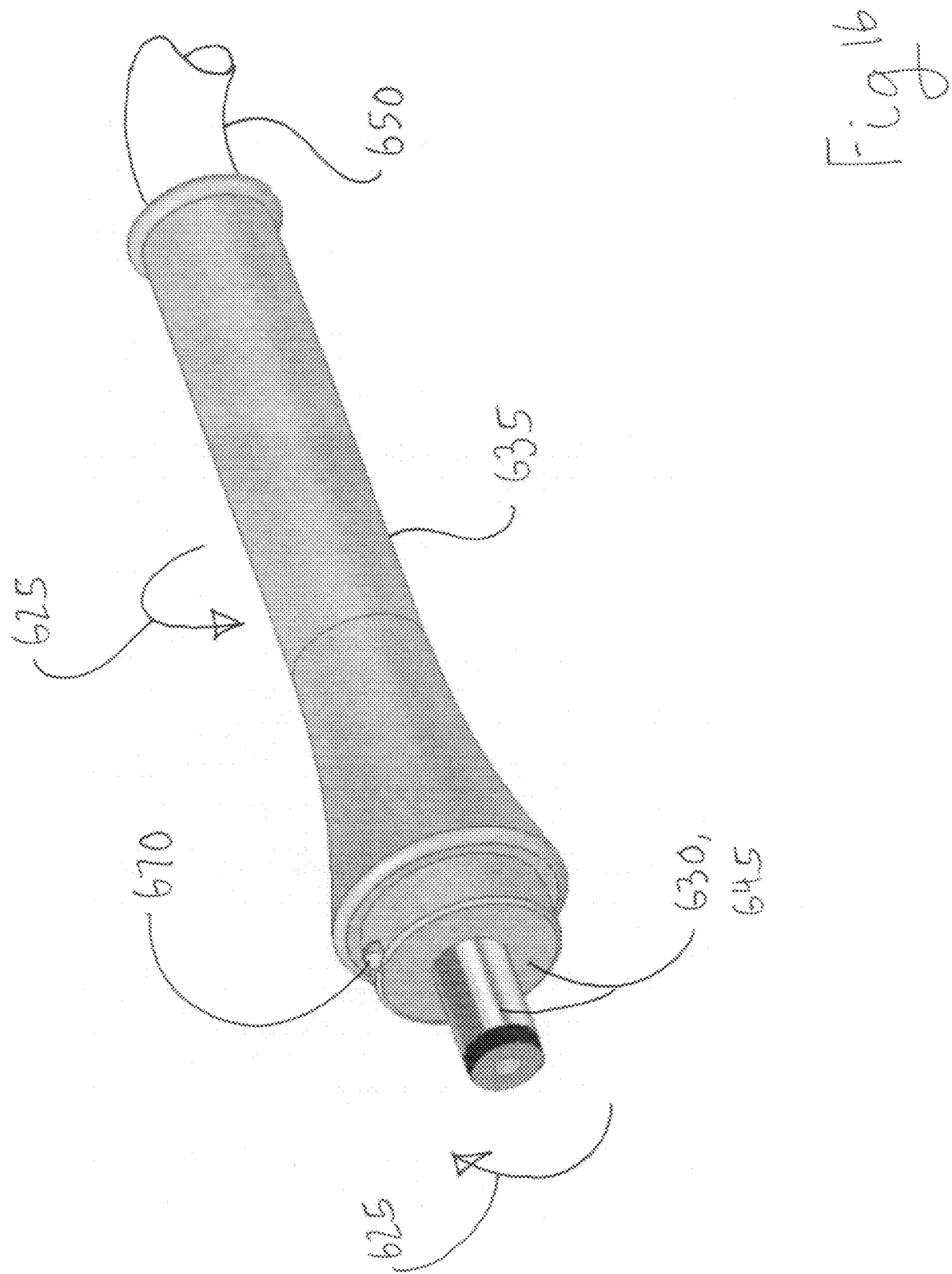
FIG. 16 shows a perspective view of the removably engageable power cord post showing the protrusion, the locking rotation, and the barrel jack used for the removable engagement of the power cord post to the second end portion of the power element.

Continuing, FIG. 16 shows a perspective view of the removably engageable power cord post 635 showing the protrusion 670, the locking rotation 625, and the barrel jack 645 used for the removable engagement 630 of the power cord post 635 to the second end portion 95 of the power element 85.

Figure 17:
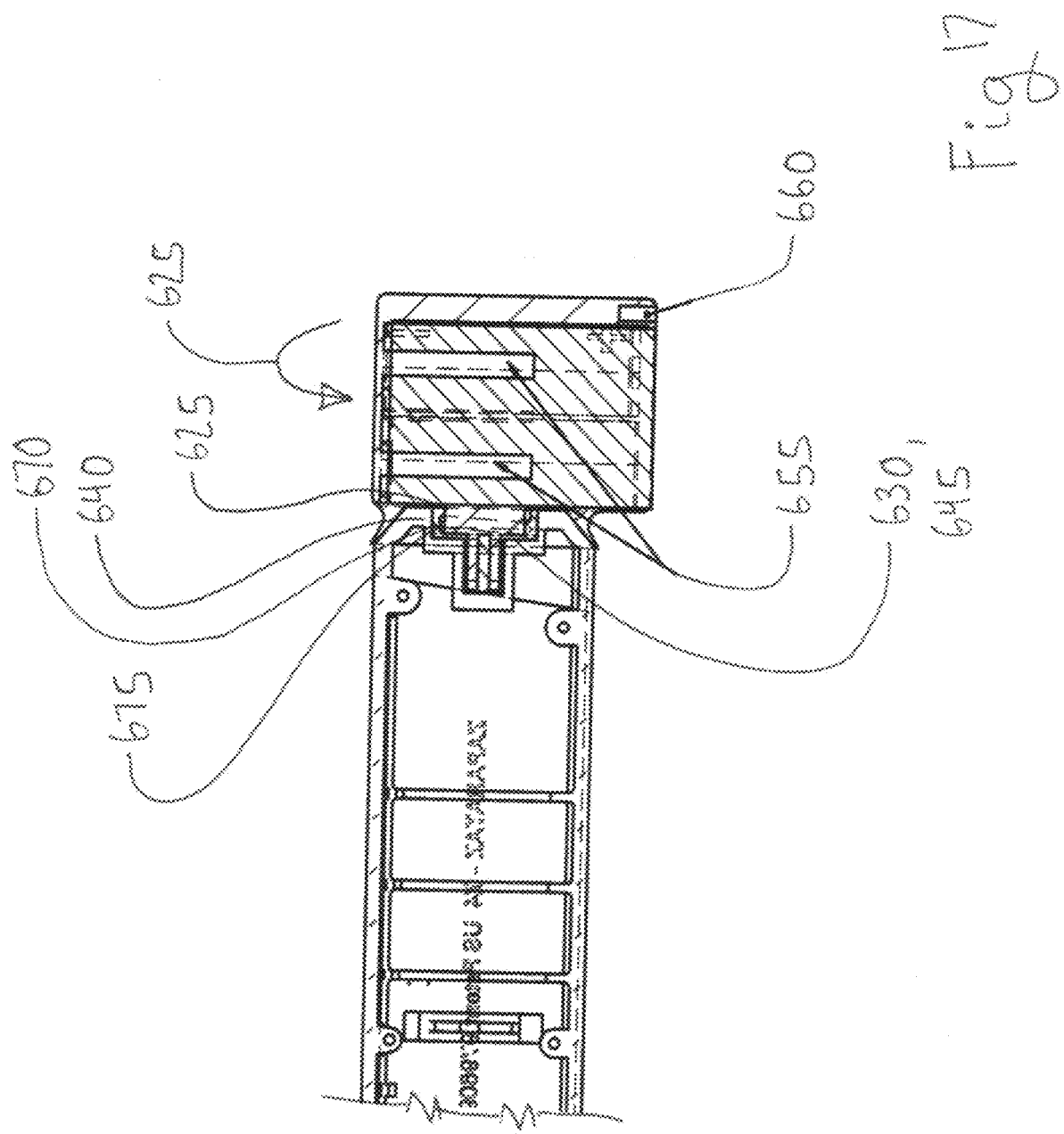
FIG. 17 shows a side elevation view of the second end portion of the power element that specifically shows the removably engageable rechargeable battery pack that rotationally engages into a helical annulus that receives the protrusion with a rotational lock arrangement.

Moving onward, FIG. 17 shows a side elevation view of the second end portion 95 of the power element 85 that specifically shows the removably engageable 630 rechargeable battery pack 655 that rotationally engages 625 into the helical annulus 675 that receives the protrusion 670 with the rotational lock arrangement 625.

Figure 18:
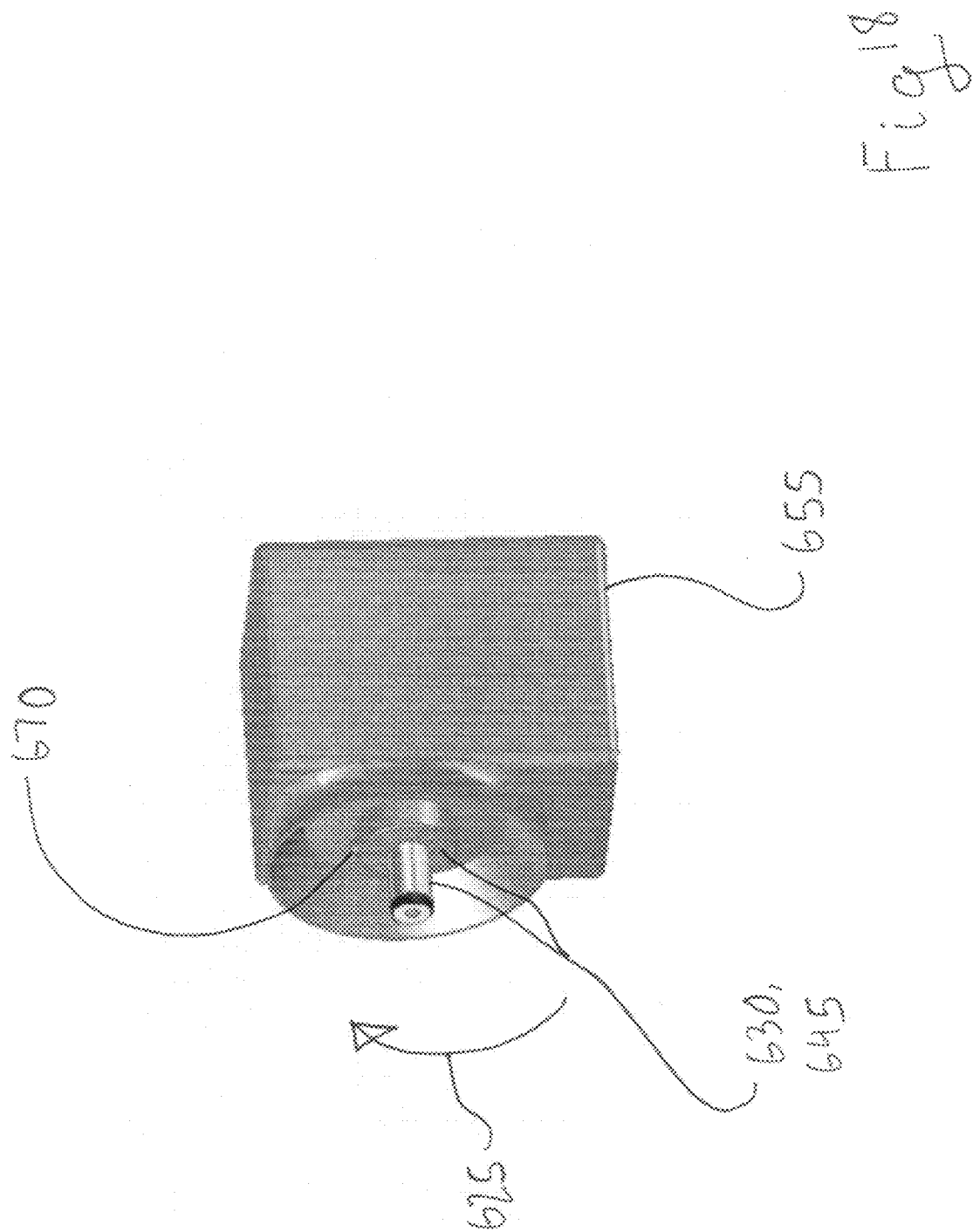
FIG. 18 shows a perspective view of the removably engageable rechargeable battery pack showing the protrusion, the locking rotation, and the barrel jack used for the removable engagement of the rechargeable battery pack to the second end portion of the power element.

Continuing, FIG. 18 shows a perspective view of the removably engageable rechargeable battery pack 655 showing the protrusion 670, the locking rotation 625, and the barrel jack 645 used for the removable engagement 630 of the rechargeable battery pack 655 to the second end portion 95 of the power element 85.

Figure 19:
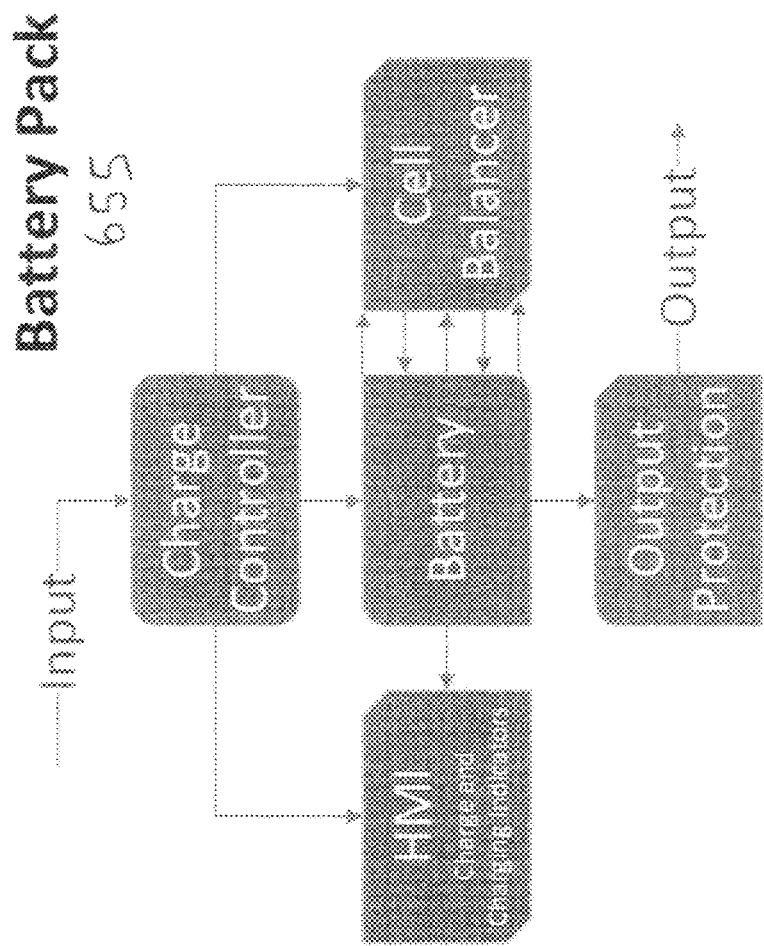
FIG. 19 shows a schematic flow diagram of the rechargeable battery pack function.

Next, FIG. 19 shows a schematic flow diagram of the rechargeable battery pack 655 function.

Figure 20:
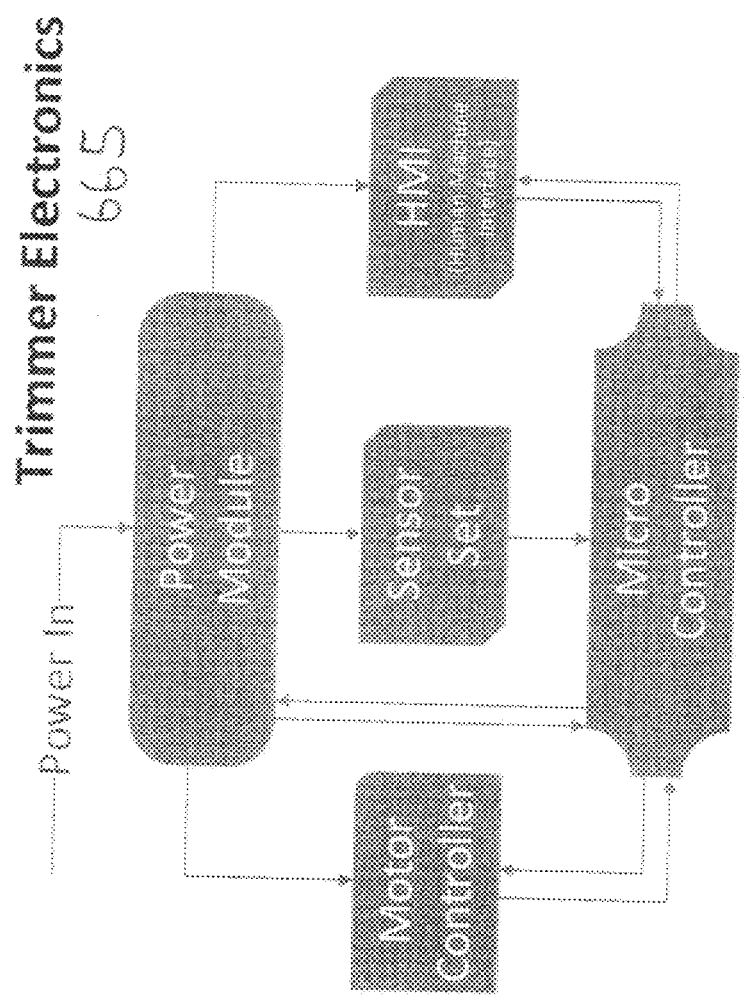
FIG. 20 shows a schematic flow diagram of the circuit board function.

Further, FIG. 20 shows a schematic flow diagram of the circuit board 665 function.

Broadly in looking at FIGS. 1 to 6, and FIGS. 9 to 11, the cutting apparatus 50 for trimming 75 the selected portion 80 from the article 70 is shown, wherein the cutting apparatus 50 includes the power element 85 that has the first end portion 90 and an opposing second end portion 95 with the longitudinal axis 105 spanning therebetween, see FIGS. 1 to 3 in particular. Wherein, the first end portion 90 has the reciprocating arm 110 having the reciprocating movement 140 along the longitudinal axis 105 and the second end portion 95 is adapted 100 to be grasped by the manual user's 55 hand 60, see FIGS. 9 and 10, with the reciprocating arm 110 extending in a cantilever section 120 having the first removably engagable rotatable couple 145 annulus 115 that is about the longitudinal axis 105 and the first end portion 90 also having the first removably engagable interface structure 150, again as best shown in FIGS. 1 to 5. The reciprocating movement 140 is created by a motor 390 via being rotationally connected to a cam drive element 400, 401 utilizing a means 415, 425, 410 for the reciprocating arm 110, 111 to dynamically interface with the cam drive element 400, 401, see FIGS. 2, 3, 12, and 13.

Also included on the cutting apparatus 50 is the removable coupling 155 having the primary end portion 160 and the opposing secondary end portion 165 with the lengthwise axis 170 spanning therebetween, with the primary end portion 160 having the removably engagable rotationally free movement about the longitudinal axis 105 second interface 175 that forms the removably engagable rotatable couple with the reciprocating arm 110 cantilever section 120 rotatable couple annulus 115 and the secondary end portion 165 having the first slotted pivotal aperture 190, see in particular FIGS. 4 to 8. Wherein, the removably engagable rotatable couple 155 transmits 195 reciprocating axial force movement 140 along the lengthwise axis 170 and the longitudinal axis 105, wherein positionally the lengthwise axis 170 and the longitudinal axis 105 are coincident 200 to one another, as best shown in FIGS. 4 to 8.

Further included in the cutting apparatus 50 is the removable cutting head assembly 205 having the proximal end portion 210 and the opposing distal end portion 215 with the long axis 220 spanning therebetween, the proximal end portion 210 includes a fourth removably engagable interface structure 225 that removably engages with the first removably engagable structure 150 such that the long axis 220 and the longitudinal axis 105 are coincident 200 to one another, see FIGS. 4 to 8. The distal end portion 215 extends outward 235 into having the pair of open cutting blades 230 that each have a free end portion 245 and an opposing first pivotally attached 250 portion forming the first pivotal connection 305 with the first pivotal axis 310 that is disposed within the rotatable pivot head 255, see FIGS. 4 to 6.

Wherein the rotatable pivot head 255 is rotatable 260 about the long axis 220 within the distal end portion 215 as the pivot head 255 has a rotatable couple third interface structure 265 with the distal end portion 215 that allows the pivot head 255 to have movement 370 while the pivot head 255 is retained in the distal end portion 215, the cutting blades 230 also extend toward the proximal end portion 210 with the pair of mid-blade sections 270 therebetween, the mid-blade portions 270 each have a second pivotal connection 275 with the second pivotal axis 280 to the pair of intermediate linkages 285, again see FIGS. 4 to 8. Wherein the linkages 285 have the single third pivotal connection 290 with the third pivotal axis 295 to one another and to the first slotted pivotal aperture 190 of the removable coupling 155 that is slidably engaged through a loop structure 300 in the proximal end portion 210 to maintain the reciprocating movement 140 into alignment. Wherein the first pivotal connection 305 through the first pivotal axis 310, the cutting blade 230 free end portions 245 having the scissor type movement 330 in the first plane 315, see FIGS. 4, 5, and 6.

Wherein operationally, the reciprocating arm 110 drives through the removable coupling 155 to the pair of intermediate linkages 285 and the cutting blades 230 such that the cutting blade 230 free end portions 245 have the scissor movement 330 from the first pivotal connection 305 to the cutting blade 230 free ends 245 that are functional to cut 75 the article 70. Further, the rotatable pivot head 255 is selectably rotatable through movement 370, wherein the first 310, second 280, and third 295 pivotal axes all rotate in unison in a circular movement 370 about the longitudinal axis 105 allowing the scissor type movement 330 in the first plane 315 to be selectively rotatable 370 about the longitudinal axis 105, see FIGS. 4 to 6. This results in the first cutting plane 315 having rotational 370 adjustment relative to the manual grasp 100 by the user's hand 60, further the removable cutting head assembly 205 and the removable coupling 155 are removably engagable from the power element 85 via the first 150, second 175, and fourth 225 removably engagable interfaces, such that the removable cutting head assembly 205 can be safely immersed into a cleaning solution separate from the power element 85, see FIGS. 1 to 6.

Optionally, for the cutting apparatus 50 for trimming 75 the selected portion 80 from the article 70, the coupling 155 that is removably engagable and rotationally free about the longitudinal axis 105 second interface 175 is preferably constructed of a T-slot 180 positioned perpendicular to the lengthwise axis 170 with a single outward radially oriented opening 185. Wherein the T-slot 180 slidably engages the reciprocating arm 110 annulus 115 for the transmission of the reciprocating movement 140 axial force while allowing free rotation for movement 370 via the t-slot 180 and annulus 115 interface and removable engagement is facilitated via the opening 185 for the separation of the reciprocating arm 110 and the removable coupling 155 that ultimately allows for the separation of the power element 85 from the cutting head assembly 205, as best shown in FIGS. 4 to 8.

Further, optionally, on the cutting apparatus 50 for trimming 75 the selected portion 80 from the article 70, can further comprise a means 340 for selectably rotationally locking the circular movement 370 in a plurality of angular positions, as best shown in FIGS. 4 to 10. Continuing, for the means 340 for selectably rotationally locking the circular movement 370 in a plurality of angular positions, is preferably constructed of a flexible extension 345 that projects in a cantilever manner away from the rotatable pivot head 255 in an outward direction from the third interface structure 265, 505 and in a direction opposite that of the first pivotal axis 310, or the channel 535 relation to the third interface structure 265, 505. The flexible extension 345 terminates in a fastener receiver 350 that frictionally projects 360 therethrough a second aperture 355 disposed in the distal end portion 215, as shown in FIG. 1 and FIGS. 4 to 8. Further, optionally the protrusion 350 and the second aperture 355 further preferably comprise a clamp 365 to help secure the fastener receiver 350 and the second aperture 355 to one another to further facilitate the selectable rotational locking of the circular movement 370 in a plurality of angular positions, see FIG. 1 and FIGS. 4 to 8.

Referring in particular to FIG. 5 for the cutting apparatus 50 for trimming 75 a selected portion 80 from the article 70, the pair of open cutting blade 230 free end portions 245 are straight 235 extending outward from the first pivotal connection 305 having the scissor type movement 330 in the first plane 315 that is in a flat plane 320 to operationally facilitate direct perpendicular cuts 75 of the article 70.

Another option for the cutting apparatus 50 for trimming 75 a selected portion 80 from an article 70, wherein the power element 85 second end portion 95 can further comprise the light 375 that emits the light beam 380 therethrough the third aperture 385 in the removable cutting head assembly 205 to operationally allow the light beam 380 to illuminate the pair of open cutting blade 230 free end portions 245 or the reciprocating cutting blade 455 and the static cutting blade 475, see FIGS. 1 to 3, 5 to 7, and 11.

As an optional enhancement to the cutting apparatus 50 for trimming 75 the selected portion 80 from the article 70, wherein the power element 85 can further comprises circuitry 665 to accommodate selectable adjustment of a rotational speed on the motor 390, thus is effect selectably controlling a speed of the scissor movement 330 or the reciprocating blade 455 movement 456 in relation to the static 475 cutting blades, see FIG. 11, plus FIGS. 2 and 3.

As a further optional enhancement to the cutting apparatus 50 for trimming the selected portion 80 from the article 70, wherein the power element 85 can further comprise a normally open switch 445 to the motor 390, wherein operationally the user 55 has to manually continuously activate or push down upon the normally open switch 445 to activate the motor 390 for safety while using the cutting apparatus, being termed a "dead man" switch, wherein if the switch 445 is released the motor 390 will deactivate, see FIG. 11, plus FIGS. 1, 2, 4, and 8.

The following list is the preferred major components of construction which are listed for a single embodiment of the cutting apparatus 50, it is understood that equivalents for each of the following could be used for the present invention of the cutting apparatus 50;

For the circuitry 440 as shown in FIG. 11 and positioned in FIGS. 2 and 3, the motor 390 is a preferably a Permanent Magnet 12 volt 16 mm Body Diameter by 2.2 in long, box Speed Reducer motor with an integral speed reducing gearbox with an output speed of 300 rpm and a 3 mm diameter output shaft. The main on/off switch is combined with a potentiometer and is preferably a 500K ohm, 0.2 W Power Rating, Single Linear Taper Switch Carbon Potentiometer Model WH138. The normally open switch 445 is preferably an Amico Momentary Push Button Tactile Switch that is a 4 pin DIP PCB that is 12 mm×12 mm×8 mm in size, UNSPSC Code 39122216. The light 375 is preferably a 5 mm White LED part number RL5-W6018 with a preferred lens from VCC part number LM-C5-LP or CLB 300 xxx. The DC motor 390 speed control is preferably a 20 W rated, code 804, Level 1, from FUTURE KIT, part number FK 804-1, being in the form of a preassembled circuit board that utilizes PWM for speed control. For the power supply it is preferably a 12 Volt 1 Amp AC to DC driven from a standard wall plug from PHC Enterprise part number PHC SW-121BP with a 2.5 mm×5.5 mm center positive output plug.

For the pair of open cutting blades 230 they are preferably constructed of tool grade stainless steel material ID CPM S35 that have a Rockwell "C" scale hardness of 59-62. For the first pivotal connection 305 whose goal is to keep a correct compressive tension as between the blades 230, the construction is preferably from a stainless steel sexbolt utilizing a pair of tension washers and a pair of self-lubricating thrust washers that are preferably an OILITE 841 thrust washer with a 5.3 mm inside diameter and a 9 mm outside diameter by 1.6 mm thick. The fourth pivotal connection 410 preferably uses a bushing that is an OILITE part number FFM0306-06. For the bushing guide 130 it is preferably constructed of an OILITE part number AAM0609-12.

For the first 414 and second 432 ball bearings are preferably ⅛" by ¼" sealed drive rod bearings from Serve City part number 535010, and the swivel couple 405 is preferably a 4 mm by 3.174 mm from Amazon part number a14061600ux0118.

Looking at particular at FIGS. 3 and 13, plus FIGS. 1, 4 to 8, and 14, 15, for the cutting apparatus 50, wherein the power element 85 that generates the reciprocating arm 110 reciprocating movement 140 is further constructed of a straight power element housing 88 along the longitudinal axis 105 that further includes an electrical drive motor 390 having a motor rotational axis 395 that is rotationally coupled to a cam drive element 400 with a means 415 for the reciprocating arm 110 to dynamically interface with the cam drive element 400. Wherein the reciprocating arm 110 is slidably engaged 135 to a bushing guide 130 affixed to the second end portion 95, the slidable engagement 135 facilitates the reciprocating movement 140, further a means 410 for anti rotation of the reciprocating arm 110 about the motor rotational axis 395 that is created by the electric motor 390 rotation about the motor rotation axis 395. Wherein operationally the reciprocating movement 140 is created by a rotation of the electric drive motor 390 wherein the cam drive element 400 and the means 415 for the reciprocating arm 110 to dynamically interface with the cam drive element 400 that converts the electrical motor 390 rotation into the reciprocating movement 140.

Again, looking at particular at FIGS. 2 and 12, plus FIGS. 1, 4 to 8, and 14, 15, for the cutting apparatus 50, wherein the means 415 for the reciprocating arm 110 to dynamically interface with the cam drive element 400 is constructed of a second pin 416 perpendicularly disposed to the reciprocating movement 140 with the second pin 416 disposed therethrough the reciprocating arm 110 that includes a first ball bearing 414 disposed on the second pin 416 and the first ball bearing 414 also disposed external to the reciprocating arm 110, see in particular FIG. 13, also FIG. 3—which shows FIG. 13 assembled. Wherein the first ball bearing 414 rides within a channel 403 in the cam drive element 400 and the means 410 for anti rotation of the reciprocating arm 110 about the motor rotational axis 395 that is created by the electric motor 390 rotation about the motor rotational axis 395 is constructed of a first pin 413 perpendicularly disposed to the reciprocating movement 140 with the first pin 413 disposed therethrough the reciprocating arm 110 that includes a first ball bearing 414 disposed on each opposite end of the first pin 413, with each first ball bearing 414 disposed external to the reciprocating arm 110, wherein the pair of first ball bearings 414 each ride within a receiving slot 411 that are disposed within the straight power element 86 housing 88 being oppositely positioned from one another, again see in particular FIG. 13, also FIG. 3—which shows FIG. 13 assembled.

In looking at FIGS. 1, 4, 5, 9, 10, 13, and 14, the cutting blade guide extension 610 is shown having the guide extension proximal end portion 611 and the opposing guide extension distal end portion 612, the cutting blade guide extension proximal end portion 611 extending from the rotatable pivot head 256, the cutting blade guide extension 610 having the first margin 613 forming the first planar area 614 that forms the first acute angle 605 with the long axis 220, the cutting blade guide extension 610 also having the second margin 616 positioned opposite of the first margin 613, the second margin 616 has an open channel 620 partially disposed within the second margin 616 that is adjacent to the guide extension proximal end portion 611, wherein the open channel 620 facilitates removable nesting of a lower blade 680 of the cutting blades 230, the second margin 616 has an arcuate ramp guide surface 615 positioned on the guide extension distal end portion 612, wherein the arcuate ramp guide surface 615 extends from the first margin 613 to the open channel 620, the cutting blade guide extension 610 is operational to guide the selected portion of the article 80 into the cutting blades 230.

Looking at FIGS. 15 and 16 for the cutting apparatus 50 for trimming a selected portion from an article 80, can further comprise a power cord post 635 that is adapted to electrically communicate with a wall electrical power outlet, the power cord post 635 having the means 630 to be removably engageable with electrical communication to the second end portion 95 of the power element 85, the means 630 to be removably engageable with electrical communication to the second end portion 95 of the power element 85 is constructed of a barrel jack 645 that has a rotational protrusion 670 that engages a helical annulus 675 to removably rotationally lock 625 the power cord post 635 to the second end portion 95 of the power element 85.

Looking at FIGS. 17 and 18 for the cutting apparatus 50 for trimming a selected portion from an article 80, can further comprise a rechargeable battery pack 655, the rechargeable battery pack 655 having the means 630 to be removably engageable with electrical communication to the second end portion 95 of the power element 85, the means 630 to be removably engageable with electrical communication to the second end portion 95 of the power element 85 is constructed of a barrel jack 645 that has a rotational protrusion 670 that engages a helical annulus 675 to removably rotationally lock 625 the rechargeable battery pack 655 to the second end portion 95 of the power element 85.

Looking at FIGS. 2 and 4, for the cutting apparatus 50 for trimming a selected portion from an article 80, can further comprising control circuitry 665 that is disposed within a housing 88 of the power element 85, the control circuitry 665 is programable to vary the reciprocating movement 140 in both a speed being a time period of the reciprocating stroke and a distance being a length of the reciprocating movement 140 to operationally vary the cutting blades 230 opening and closing distance 330 scissor type movement and a speed of the scissor type movement 330 including single to multiple cutting cycles of the cutting blades 230.

CONCLUSION

Accordingly, the present invention of a cutting apparatus has been described with some degree of particularity directed to the embodiments of the present invention. It should be appreciated, though; that the present invention is defined by the following claim construed in light of the prior art so modifications or changes may be made to the exemplary embodiments of the present invention without departing from the inventive concepts contained therein.

The invention claimed is:

1. A cutting apparatus for trimming a selected portion from an article, said cutting apparatus comprising:
  (a) a power element that includes a first end portion and an opposing second end portion with a longitudinal axis spanning therebetween, wherein said first end portion has a reciprocating arm having a reciprocating movement along said longitudinal axis and said second end portion is adapted to be grasped by a manual user's hand, said reciprocating arm extending in a cantilever section having a first removably engagable rotatable couple annulus that is about said longitudinal axis and said first end portion also having a first removably engagable interface structure, said reciprocating movement is created by a motor via being rotationally connected to a cam drive element utilizing a means for said reciprocating arm to dynamically interface with said cam drive element;
  (b) a removable coupling having a primary end portion and an opposing secondary end portion with a lengthwise axis spanning therebetween, said primary end portion having a removably engagable rotationally free about said longitudinal axis second interface that forms a removably engagable rotatable couple with said reciprocating arm cantilever section rotatable couple annulus and said secondary end portion having a first slotted pivotal aperture, wherein said removably engagable rotatable couple transmits reciprocating axial force along said lengthwise axis and said longitudinal axis, wherein positionally said lengthwise axis and said longitudinal axis are coincident to one another;
  (c) a removable cutting head assembly having a proximal end portion and an opposing distal end portion with a long axis spanning therebetween, said proximal end portion includes a fourth removably engagable interface structure that removably engages with said first removably engagable structure such that said long axis and said longitudinal axis are coincident to one another, said distal end portion extends outward into having a pair of open cutting blades that each have a free end portion and an opposing first pivotally attached portion forming a first pivotal connection with a first pivotal axis that is disposed within a rotatable pivot head, wherein said pivot head is rotatable about said long axis within said distal end portion as said pivot head has a rotatable couple third interface structure with said distal end portion, said cutting blades also extend toward said proximal end portion with a pair of mid-blade sections therebetween, said mid-blade portions each have a second pivotal connection with a second pivotal axis to a pair of intermediate linkages, wherein said linkages have a single third pivotal connection with a third pivotal axis to one another and to said first slotted pivotal aperture of said removable coupling that is slidably engaged through a loop structure to said proximal end portion to maintain said reciprocating movement, wherein said first pivotal connection through said first pivotal axis, said cutting blade free end portions having a scissor type movement in a first plane, wherein operationally said reciprocating arm drives through said removable coupling to said pair of intermediate linkages and said cutting blades such that said cutting blade free end portions have said scissor movement from said first pivotal connection to said cutting blade free ends that are functional to cut the article, further said rotatable pivot head is selectably rotatable, wherein said first, second and third pivotal axes all rotate in unison in a circular movement about said longitudinal axis allowing said scissor type movement in said first plane to be selectively rotatable about said longitudinal axis, resulting in said first cutting plane having rotational adjustment relative to said manual grasp by the user's hand, further said cutting head assembly and said removable coupling are removably engagable from said power element via said first, second, and fourth removably engagable interfaces, such that said cutting head assembly can be safely immersed into a cleaning solution separate from said power element; and
  (d) a cutting blade guide extension having a guide extension proximal end portion and an opposing guide extension distal end portion, said cutting blade guide extension proximal end portion extending from said rotatable pivot head, said cutting blade guide extension having a first margin forming a first planar area that forms a first acute angle with said long axis, said cutting blade guide extension also having a second margin positioned opposite of said first margin, said second margin has an open channel partially disposed within said second margin that is adjacent to said guide extension proximal end portion, wherein said open channel facilitates removable nesting of a lower blade of said cutting blades, said second margin has an arcuate ramp guide surface positioned on said guide extension distal end portion, wherein said arcuate ramp guide surface extends from said first margin to said open channel, said cutting blade guide extension is operational to guide the selected portion of the article into said cutting blades.

2. A cutting apparatus for trimming a selected portion from an article according to claim 1 wherein said coupling removably engagable rotationally free about said longitudinal axis second interface is constructed of a T-slot positioned perpendicular to said lengthwise axis with a single outward radially oriented opening, wherein said T-slot slidably engages said reciprocating arm annulus.

3. A cutting apparatus for trimming a selected portion from an article according to claim 2 further comprising a means for selectably rotationally locking said circular movement in a plurality of angular positions.

4. A cutting apparatus for trimming a selected portion from an article according to claim 3 wherein said means for selectably rotationally locking said circular movement in a plurality of angular positions is constructed of a flexible extension that projects in a cantilever manner away from said rotatable pivot head in an outward direction from said third interface structure and in a direction opposite that of said first pivotal axis relation to said third interface structure, said flexible extension terminates in a fastener receiver that uses a fastener clamp that frictionally projects therethrough a second aperture disposed in said distal end portion.

5. A cutting apparatus for trimming a selected portion from an article according to claim 4 wherein said protrusion and said second aperture further comprises a clamp to help secure said fastener receiver and said second aperture to one another to further facilitate said selectable rotational locking of said circular movement in a plurality of angular positions.

6. A cutting apparatus for trimming a selected portion from an article according to claim 5 wherein said pair of open cutting blade free end portions are straight extending outward from said first pivotal connection having said scissor type movement in said first plane that is a flat plane to operationally facilitate direct perpendicular cuts of the article.

7. A cutting apparatus for trimming a selected portion from an article according to claim 5 wherein said power element that generates said reciprocating arm reciprocating movement is further constructed of a straight power element housing along said longitudinal axis that further includes an electrical drive motor having a motor rotational axis that is rotational coupled to a cam drive element with a means for said reciprocating arm to dynamically interface with said cam drive element, wherein said reciprocating arm is slidably engaged to a bushing guide affixed to said second end portion, said slidable engagement facilitates said reciprocating movement, further a means for anti rotation of said reciprocating arm about said motor rotational axis that is created by said electric motor rotation, wherein operationally said reciprocating movement is created by a rotation of said electric drive motor wherein said cam drive element and said means for said reciprocating arm to dynamically interface with said cam drive element that converts said electrical motor rotation into said reciprocating movement.

8. A cutting apparatus for trimming a selected portion from an article according to claim 7 wherein said means for said reciprocating arm to dynamically interface with said cam drive element is constructed of a second pin perpendicularly disposed to said reciprocating movement with said second pin disposed therethrough said reciprocating arm that includes a first ball bearing disposed on said second pin and said first ball bearing also disposed external to said reciprocating arm, wherein said first ball bearing rides within a channel in said cam drive element and said means for anti rotation of said reciprocating arm about said motor rotational axis that is created by said electric motor rotation is constructed of a first pin perpendicularly disposed to said reciprocating movement with said first pin disposed therethrough said reciprocating arm that includes a first ball bearing disposed on each opposite end of said first pin, with each said first ball bearing disposed external to said reciprocating arm, wherein said pair of first ball bearings each ride within a receiving slot that are disposed within said straight power element housing being oppositely positioned from one another.

9. A cutting apparatus for trimming a selected portion from an article according to claim 1 further comprising a power cord post that is adapted to electrically communicate with a wall electrical power outlet, said power cord post having a means to be removably engageable with electrical communication to said second end portion of said power element.

10. A cutting apparatus for trimming a selected portion from an article according to claim 9 wherein said means to be removably engageable with electrical communication to said second end portion of said power element is constructed of a barrel jack that has a rotational protrusion that engages a helical annulus to removably rotationally lock said power cord post to said second end portion of said power element.

11. A cutting apparatus for trimming a selected portion from an article according to claim 1 further comprising a rechargeable battery pack, said rechargeable battery pack having a means to be removably engageable with electrical communication to said second end portion of said power element.

12. A cutting apparatus for trimming a selected portion from an article according to claim 11 wherein said means to be removably engageable with electrical communication to said second end portion of said power element is constructed of a barrel jack that has a rotational protrusion that engages a helical annulus to removably rotationally lock said rechargeable battery pack to said second end portion of said power element.

13. A cutting apparatus for trimming a selected portion from an article according to claim 1 further comprising control circuitry that is disposed within a housing of said power element, said control circuitry is programable to vary said reciprocating movement in both a speed being a time period of said reciprocating stroke and a distance being a length of said reciprocating movement to operationally vary said cutting blades opening and closing distance scissor type movement and a speed of said scissor type movement including single to multiple cutting cycles of the cutting blades.

* * * * *